（12）United States Patent
Honjo et al.

(10) Patent No.: US 10,337,924 B2
(45) Date of Patent: *Jul. 2, 2019

(54) INTEGRATED ANTENNA SYSTEM AND RELATED COMPONENT MANAGEMENT

(71) Applicant: Google LLC, Mountain View, CA (US)

(72) Inventors: Hirofumi Honjo, Palo Alto, CA (US);
Shu-Li Wang, Santa Clara, CA (US);
Arjuna Sivasithambaresan, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/663,199

(22) Filed: Jul. 28, 2017

(65) Prior Publication Data

US 2018/0094981 A1    Apr. 5, 2018

Related U.S. Application Data

(63) Continuation of application No. 14/836,323, filed on Aug. 26, 2015, now Pat. No. 9,778,114.

(51) Int. Cl.
| | |
|---|---|
| *G01H 5/00* | (2006.01) |
| *G01J 5/00* | (2006.01) |
| *G01V 8/10* | (2006.01) |
| *H04B 1/40* | (2015.01) |
| *G01J 5/02* | (2006.01) |
| *G01J 5/04* | (2006.01) |
| *H01Q 1/38* | (2006.01) |
| *H04W 84/12* | (2009.01) |

(Continued)

(52) U.S. Cl.
CPC ............. *G01J 5/0025* (2013.01); *G01J 5/025* (2013.01); *G01J 5/04* (2013.01); *G01V 8/10* (2013.01); *H01Q 1/38* (2013.01); *H04B 1/40* (2013.01); *G01J 2005/068* (2013.01); *H01Q 1/225* (2013.01); *H04W 84/12* (2013.01); *H04W 84/18* (2013.01)

(58) Field of Classification Search
CPC ............................ F24F 11/0009; G05B 15/02
See application file for complete search history.

(56) References Cited

U.S. PATENT DOCUMENTS

| | | |
|---|---|---|
| 3,140,445 A | 7/1964 | Myers et al. |
| 9,304,500 B2 | 4/2016 | McMahon |
| | (Continued) | |

OTHER PUBLICATIONS

U.S. Appl. No. 14/836,699, filed Aug. 26, 2105, 120 pages.
(Continued)

*Primary Examiner* — Shukri Taha
(74) *Attorney, Agent, or Firm* — Kilpatrick Townsend & Stockton LLP

(57) ABSTRACT

Various arrangements for detecting an object using a passive infrared (PIR) sensor module of a sensor device. A PIR data stream may be received from the PIR sensor module indicative of measurements performed by the PIR sensor module. An indication may be received from a transceiver that identifies a beginning of the data transmission. A portion of the PIR data stream may be blanked in response to receiving the indication of the beginning of the data transmission, the portion of the PIR data stream corresponding to a defined time duration. A presence of an object may be determined using the PIR data stream, excluding the blanked portion.

20 Claims, 28 Drawing Sheets

(51) Int. Cl.
*H04W 84/18* (2009.01)
*G01J 5/06* (2006.01)
*H01Q 1/22* (2006.01)

(56) References Cited

U.S. PATENT DOCUMENTS

| | | |
|---|---|---|
| 2004/0217860 A1 | 11/2004 | Ergun et al. |
| 2007/0139277 A1 | 6/2007 | Nissinen et al. |
| 2010/0277306 A1 | 11/2010 | Leinen et al. |
| 2011/0201290 A1 | 8/2011 | Miyagi et al. |
| 2012/0128025 A1 | 5/2012 | Huppi et al. |
| 2014/0052300 A1* | 2/2014 | Matsuoka .......... G05D 23/1917 700/276 |
| 2014/0316581 A1 | 10/2014 | Fadell et al. |

OTHER PUBLICATIONS

U.S. Appl. No. 14/836,648, filed Aug. 26, 2015, 121 pages.
U.S. Appl. No. 14/836,568, filed Aug. 26, 2015, 123 pages.
U.S. Appl. No. 14/836,744, filed Aug. 26, 2015, 76 pages.
U.S. Appl. No. 14/836,660, filed Aug. 26, 2015, 77 pages.
U.S. Appl. No. 14/836,631, filed Aug. 26, 2015, 85 pages.
U.S. Appl. No. 14/836,595, filed Aug. 26, 2015, 78 pages.
International Search Report and Written Opinion of PCT/US2016/047320 dated Oct. 27, 2016, all pages.

* cited by examiner

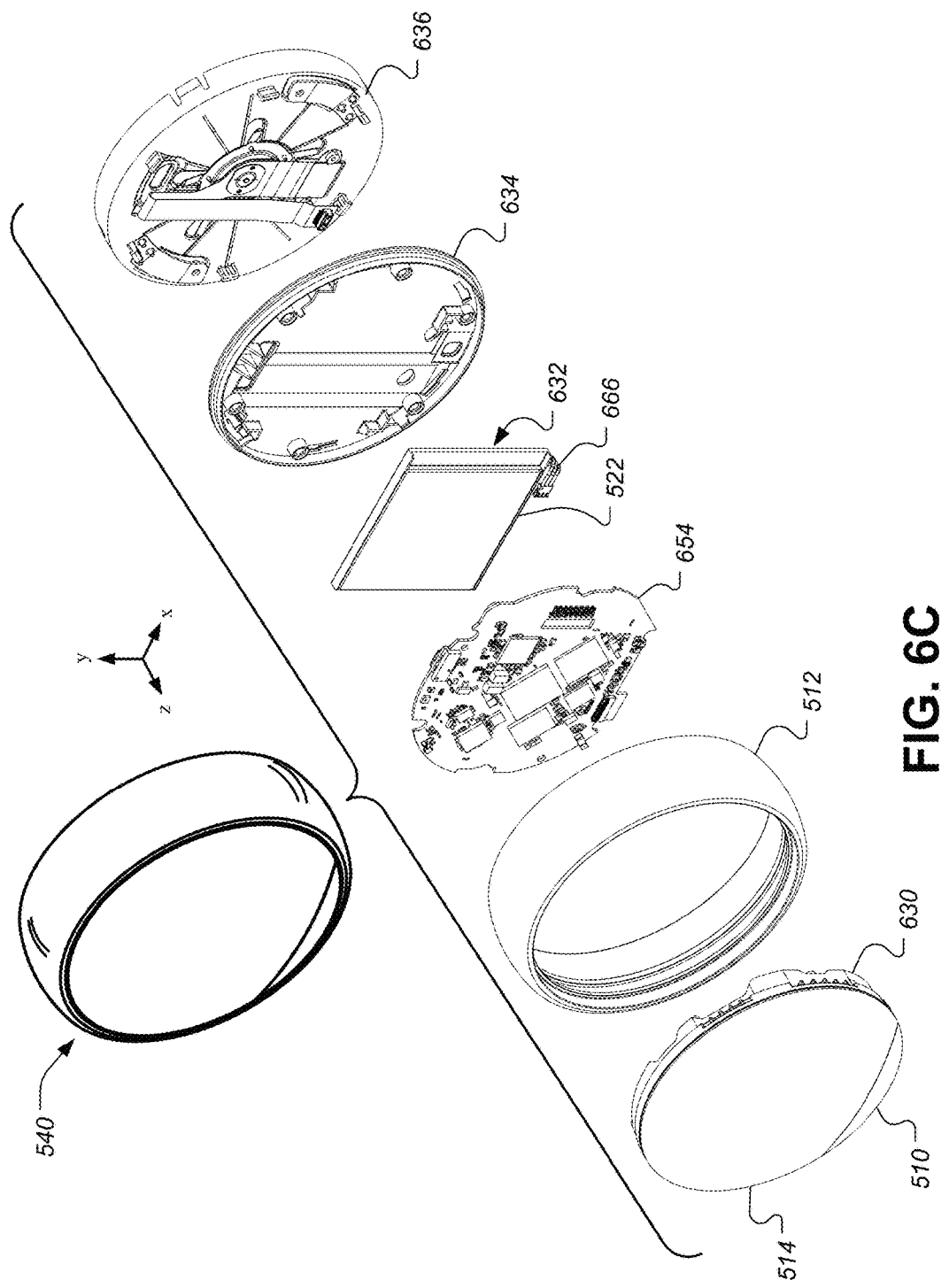

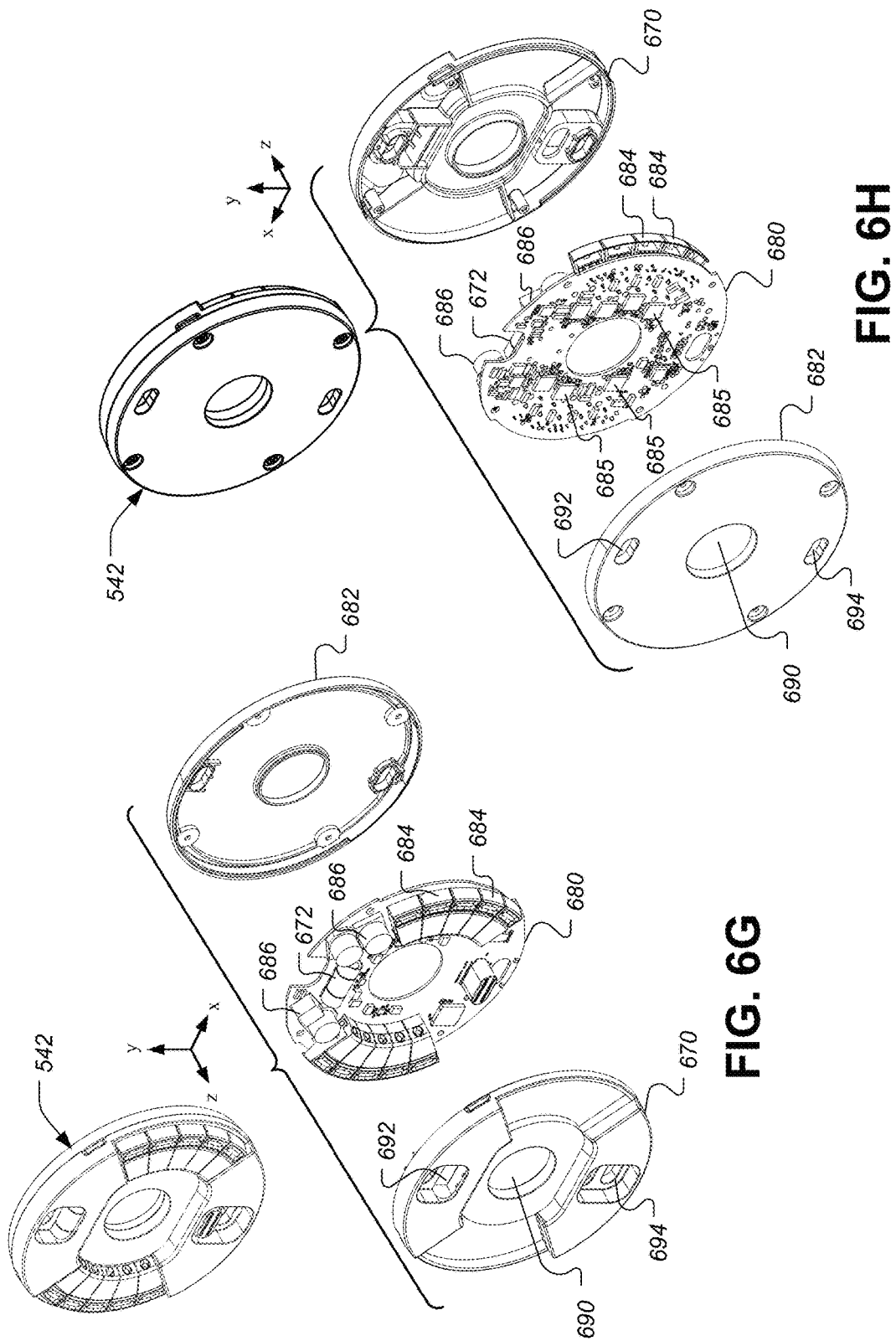

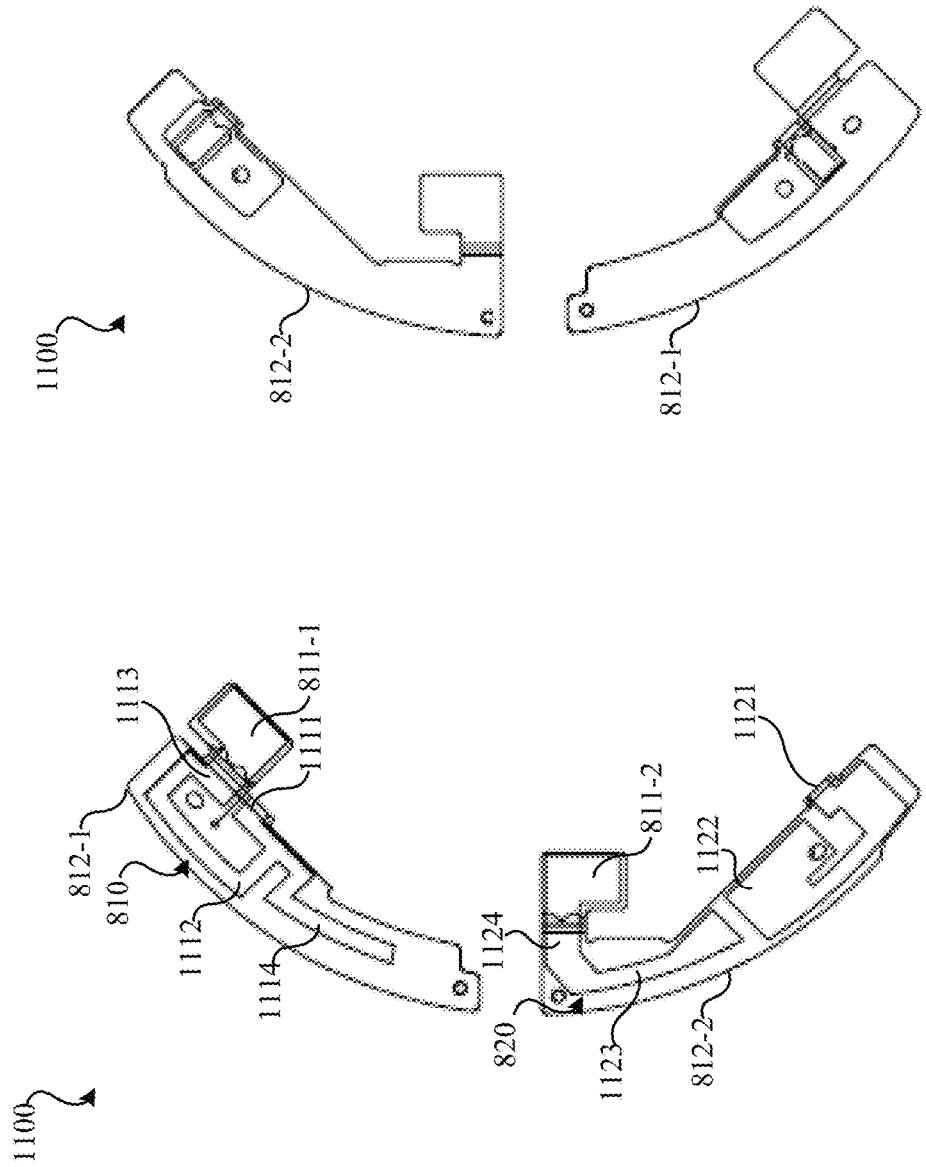

INTEGRATED ANTENNA SYSTEM AND RELATED COMPONENT MANAGEMENT

CROSS-REFERENCE TO RELATED APPLICATIONS

This application is a continuation of U.S. patent application Ser. No. 14/836,323, filed Aug. 26, 2015, which is incorporated by reference herein.

BACKGROUND

Sensor devices, such as thermostats, carbon monoxide detectors, smoke detectors, and other forms of sensors are increasingly "smart," referring to their ability to communicate with remote computerized devices. Users have shown a preference for small, well-made devices that are functional, aesthetically pleasing, and user-friendly. Being user-friendly can be realized at least in part through a large, possibly multi-colored, electronic display. While such features may be desirable to users, these features and other design challenges of sensor devices (and small electronics generally) can result in a challenging radio frequency (RF) environment. Such an RF environment can negatively impact wireless communication between the sensor device and remote computerized devices. Further, such an RF environment can negatively impact the functionality of other components of such sensor devices.

SUMMARY

In some embodiments, a sensor antenna system is presented. The system may include a housing, a passive infrared (PIR) sensor module located within the housing, an antenna located within the housing, and a wireless communication transceiver located within the housing that transmits data via the antenna. The wireless communication transceiver may output data indicative of a time period during which a data transmission is occurring. The system may include one or more processors located with the housing that are in communication with the PIR sensor module and the wireless communication transceiver. The one or more processors may be configured to receive a PIR data stream from the PIR sensor module indicative of measurements performed by the PIR sensor module. The one or more processors may be configured to receive from the wireless communication transceiver an indication of a beginning of the data transmission. The one or more processors may be configured to blank a portion of the PIR data stream in response to receiving the indication of the beginning of the data transmission, the portion of the PIR data stream corresponding to a defined time duration. The one or more processors may be configured to determine a presence of an object using the PIR data stream, excluding the blanked portion.

Embodiments of such a system may include one or more of the following features: 2. The one or more processors may be configured to receive from the wireless communication transceiver a second indication of an end of the data transmission. The one or more processors may be configured to blank a second portion of the PIR data stream in response to receiving the indication of the end of the data transmission, the second portion of the PIR data stream corresponding to a second defined time duration. The one or more processors being configured to determine the presence of the object using the PIR data stream may include excluding the second blanked portion in addition to the blanked portion. The second defined time duration may be a same duration as the defined time duration. The PIR sensor module may be within a distance of 5 cm, as close as 1 mm, of the wireless communication transceiver. The wireless communication transceiver may be configured to output a status signal that is either high or low depending on whether the wireless communication transceiver is transmitting or not transmitting. The wireless communication transceiver may transmit using a wireless local area network protocol. The antenna may be a printed circuit board (PCB) mounted loop antenna having a tail. The system may include an electronic display located within the housing that is in communication with the one or more processors, wherein the electronic display comprises a metallic shield. The metallic shield may be electrically connected with the antenna such that the metallic shield serves as the loop antenna's RF ground. The housing may include a metallic ring that encircles the PIR sensor module, wireless communication transceiver, and the one or more processors along an axis. The metallic shield may be perpendicular to the axis, the metallic ring may serve as a user input component, and the one or more processors may receive data indicative of the metallic ring being rotated clockwise and counterclockwise. The antenna may include a main loop and a capacitively-coupled tail portion, wherein the main loop and the capacitively-coupled tail portion provide dual-band resonance. The system may include a second antenna located within the housing, wherein the second antenna is coplanar with the antenna; the second antenna is a second PCB-mounted loop antenna having a tail; and the second antenna is electrically connected with the metallic shield of the electronic display such that the second antenna and the antenna both use the metallic shield as RF ground. The system may include a second wireless communication transceiver located within the housing that transmits and receives data via the second antenna.

In some embodiments, a method for detecting an object using a passive infrared (PIR) sensor module is presented. The method may include receiving a PIR data stream from the PIR sensor module of the sensor device, the PIR data stream being indicative of measurements performed by the PIR sensor module. The method may include while receiving the PIR data stream, receiving, by the processing system from a wireless communication transceiver, an indication of a beginning of a data transmission by a wireless transceiver of the sensor device. The method may include blanking a portion of the PIR data stream in response to receiving the indication of the beginning of the data transmission, the portion of the PIR data stream corresponding to a defined time duration. The method may include determining a presence of the object using the PIR data stream, excluding the blanked portion.

Embodiments of such a method may include one or more of the following features: The method may include receiving from the wireless communication transceiver a second indication of an end of the data transmission. The method may include blanking a second portion of the PIR data stream in response to receiving the indication of the end of the data transmission, the second portion of the PIR data stream corresponding to a second defined time duration. The method may include storing the defined time duration. The method may include transmitting data, by the wireless communication transceiver, via an antenna that uses a metallic backplane of an electronic display of the sensor device. The method may include activating, by the processing system of the sensor device, the electronic display, such that a temperature is displayed by the electronic display. The metallic backplane of the electronic display may be used as RF ground by the antenna while the wireless communication transceiver is transmitting data via the antenna and while the electronic display is activated.

In some embodiments, a non-transitory processor-readable medium for detecting an object using a passive infrared (PIR) sensor module of a sensor device is presented. Instructions stored by the medium may cause one or more processors to receive a PIR data stream from the PIR sensor module of the sensor device, the PIR data stream being indicative of measurements performed by the PIR sensor module. Instructions stored by the medium may cause one or more processors to while receiving the PIR data stream, receive, from a wireless communication transceiver an indication of a beginning or end of a data transmission by a wireless transceiver of the sensor device. Instructions stored by the medium may cause one or more processors to blank a portion of the PIR data stream in response to receiving the indication of the beginning of the data transmission, the portion of the PIR data stream corresponding to a defined time duration. Instructions stored by the medium may cause one or more processors to determine a presence of the object using the PIR data stream, excluding the blanked portion.

BRIEF DESCRIPTION OF THE DRAWINGS

FIG. 6C-6D illustrate exploded front and rear perspective views, respectively, of a head unit with respect to its primary components, according to some embodiments.

FIG. 6G-6H illustrate exploded front and rear perspective views, respectively, of a back plate unit with respect to its primary components, according to some embodiments.

FIGS. 11A and 11B illustrate views of a system of two antennas which may be installed with a sensor device.

DETAILED DESCRIPTION

Figure 1:
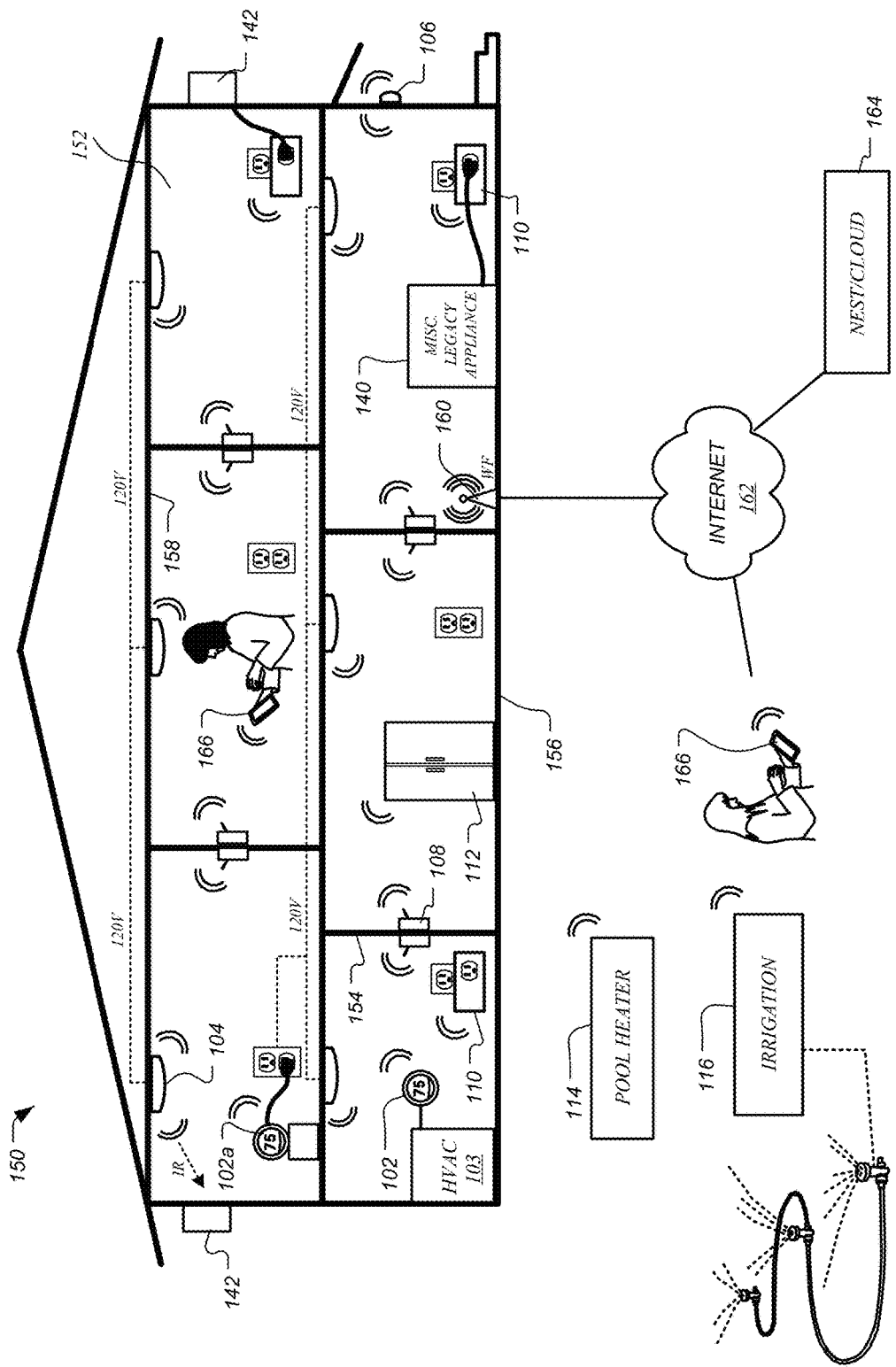
FIG. 1 illustrates an example of a smart home environment within which one or more of the devices, methods, systems, services, and/or computer program products described further herein can be applicable.

A sensor device, such as a thermostat, may use multiple wireless transceivers to wirelessly communicate with other computerized devices. For instance, a sensor device may communicate with a wireless local area network (WLAN) router using a protocol such as based on IEEE's 802.11 standard set. The sensor device may communicate using multiple separate transceivers on separate frequencies or the same frequency to communicate with other sensor devices, mobile devices, or other wireless communication-enabled devices. For instance, the sensor device may use a low power wireless personal area network (WPAN) communication protocol, such as 6LoWPAN, using IEEE's 802.15.4 standard set. To use such varied communication protocols, the sensor device may need to have multiple antennas and associated wireless transceivers on-board; such antennas may each be tuned for sensitivity on one or more particular frequency bands.

The transceivers and antennas, in addition to being able to effectively communicate using different protocols and frequencies, may need to coexist with other electronic devices on-board the sensor device. For instance, the sensor device may be small and contain a significant amount of metal that can negatively affect the ability of the antennas to receive and/or transmit data on their respective frequencies. In some embodiments, the sensor device is encircled by a metallic ring. This metallic ring may serve as a user-input device, allowing a user to rotate the metallic ring clockwise, counterclockwise, and, in some embodiments, push the metallic ring to provide input to the sensor device. While this metallic ring may be aesthetically-pleasing and provide the functionality of receiving user input, the metallic ring may also create a challenging RF environment for data transmission and/or data reception. Further, a display may be presented on the sensor device. In some embodiments, this display may be in a plane that is perpendicular or substantially perpendicular (e.g., within 1, 5, or 10 degrees of perpendicular) with a center axis of the metallic ring. This display may be a multi-colored electronic display that presents text and/or graphics for viewing by a user. The display may have a metallic backplate.

One or multiple of the antennas may be loop, meander line, inverted-F, or hybrid antennas (a hybrid being, for example, a combination of a loop and meander line antenna) that are each positioned within the sensor device such that the antenna element is within the metallic ring but is not located directly in front of or behind the metallic backplate of the display. Rather, each antenna element may be electrically connected with the metallic backplate of the display such that the backplate serves as an RF ground plane for the antenna element.

Additionally or alternatively, the sensor device may have one or more passive infrared (PIR) sensors used to detect the presence of an infrared-emitting object in the vicinity of the sensor device, such as a person either present in front of the sensor device or moving in the vicinity of the sensor device (e.g., to detect occupancy within a structure). By the one or more PIR sensors being in close proximity to the one or more antennas and/or the transceivers, transients may be induced on the output of the one or more PIR sensors. For instance, when the transceiver that communicates over a WLAN (e.g. using IEEE's 802.11 standard set) initiates and ends data transmissions, transients may be induced on the output of a PIR sensor module. Such transients, if left unaddressed, may lead to inadvertent identification of a person being present or not present in the vicinity of the sensor device. When the WLAN transceiver is transmitting data via its antenna, the output of one or more PIR sensor modules may be blanked for a duration of time coinciding with the start of the data transmission and a duration of time coinciding with the end of the data transmission.

While the embodiments detailed herein can be applied to various types of sensor devices, such as carbon monoxide sensors, smoke detectors, or humidity detectors, the description of this document focuses on embodiments as used in thermostats. It should be understood that the principles detailed herein can be applied to other types of devices.

The subject matter of this patent specification relates to the subject matter of the following commonly assigned applications, filed on the same day as the present application, each of which is incorporated by reference herein:

U.S. patent application Ser. No. 14/836,699, filed on Aug. 26, 2015, titled THERMOSTAT WITH MULTIPLE SENSING SYSTEMS INTEGRATED THEREIN, to Stefanski et al.

U.S. patent application Ser. No. 14/836,648, filed on Aug. 26, 2015, titled THERMOSTAT WITH MULTIPLE SENSING SYSTEMS INCLUDING PRESENCE DETECTION SYSTEMS INTEGRATED THEREIN, to Goyal et al.

U.S. patent application Ser. No. 14/836,568, filed on Aug. 26, 2015, titled AUTOMATED DISPLAY ADJUSTMENTS FOR SMART-HOME DEVICE BASED ON VIEWER LOCATION OR OTHER SENSED VIEWER-RELATED PARAMETERS, to Goyal et al.

U.S. patent application Ser. No. 14/836,744, filed on Aug. 26, 2015, titled SMART THERMOSTAT ROBUST AGAINST ADVERSE EFFECTS FROM INTERNAL HEAT-GENERATING COMPONENTS, to Stefanski et al.

U.S. patent application Ser. No. 14/836,660, filed on Aug. 26, 2015, titled THERMOSTAT ELECTRONIC DISPLAY AND LENSING ELEMENT THEREFOR, to Giustina.

U.S. patent application Ser. No. 14/836,631, filed on Aug. 26, 2015, titled ROTATION DETECTION FOR RING-SHAPED USER INPUT MEMBER OF SMART-HOME DEVICE, to Stefanski et al.

U.S. patent application Ser. No. 14/836,595, filed on Aug. 26, 2015, titled USER INTERFACE MEMBER FOR ELECTRONIC DEVICE, to Giustina et al.

The above-referenced patent applications are collectively referenced herein as "the commonly assigned incorporated applications."

The Smart-Home Environment

A detailed description of the inventive body of work is provided herein. While several embodiments are described, it should be understood that the inventive body of work is not limited to any one embodiment, but instead encompasses numerous alternatives, modifications, and equivalents. In addition, while numerous specific details are set forth in the following description in order to provide a thorough understanding of the inventive body of work, some embodiments can be practiced without some or all of these details. Moreover, for the purpose of clarity, certain technical material that is known in the related art has not been described in detail in order to avoid unnecessarily obscuring the inventive body of work.

As used herein the term "HVAC" includes systems providing both heating and cooling, heating only, cooling only, as well as systems that provide other occupant comfort and/or conditioning functionality such as humidification, dehumidification and ventilation.

As used herein the terms power "harvesting," "sharing" and "stealing" when referring to HVAC thermostats all refer to thermostats that are designed to derive power from the power transformer through the equipment load without using a direct or common wire source directly from the transformer.

As used herein the term "residential" when referring to an HVAC system means a type of HVAC system that is suitable to heat, cool and/or otherwise condition the interior of a building that is primarily used as a single family dwelling. An example of a cooling system that would be considered residential would have a cooling capacity of less than about 5 tons of refrigeration (1 ton of refrigeration=12,000 Btu/h).

As used herein the term "light commercial" when referring to an HVAC system means a type of HVAC system that is suitable to heat, cool and/or otherwise condition the interior of a building that is primarily used for commercial purposes, but is of a size and construction that a residential HVAC system is considered suitable. An example of a cooling system that would be considered residential would have a cooling capacity of less than about 5 tons of refrigeration.

As used herein the term "thermostat" means a device or system for regulating parameters such as temperature and/or humidity within at least a part of an enclosure. The term "thermostat" may include a control unit for a heating and/or cooling system or a component part of a heater or air conditioner. As used herein the term "thermostat" can also refer generally to a versatile sensing and control unit (VSCU unit) that is configured and adapted to provide sophisticated, customized, energy-saving HVAC control functionality while at the same time being visually appealing, non-intimidating, elegant to behold, and delightfully easy to use.

FIG. 1 illustrates an example of a smart home environment within which one or more of the devices, methods, systems, services, and/or computer program products described further herein can be applicable. The depicted smart home environment includes a structure 150, which can include, e.g., a house, office building, garage, or mobile home. It will be appreciated that devices can also be integrated into a smart home environment that does not include an entire structure 150, such as an apartment, condominium, or office space. Further, the smart home environment can control and/or be coupled to devices outside of the actual structure 150. Indeed, several devices in the smart home environment need not physically be within the structure 150 at all. For example, a device controlling a pool heater or irrigation system can be located outside of the structure 150.

The depicted structure 150 includes a plurality of rooms 152, separated at least partly from each other via walls 154. The walls 154 can include interior walls or exterior walls. Each room can further include a floor 156 and a ceiling 158. Devices can be mounted on, integrated with and/or supported by a wall 154, floor or ceiling.

The smart home depicted in FIG. 1 includes a plurality of devices, including intelligent, multi-sensing, network-connected devices that can integrate seamlessly with each other and/or with cloud-based server systems to provide any of a variety of useful smart home objectives. One, more or each of the devices illustrated in the smart home environment and/or in the figure can include one or more sensors, a user interface, a power supply, a communications component, a modularity unit and intelligent software as described herein. Examples of devices are shown in FIG. 1.

An intelligent, multi-sensing, network-connected thermostat 102 can detect ambient climate characteristics (e.g., temperature and/or humidity) and control a heating, ventilation and air-conditioning (HVAC) system 103. One or more intelligent, network-connected, multi-sensing hazard detection units 104 can detect the presence of a hazardous substance and/or a hazardous condition in the home environment (e.g., smoke, fire, or carbon monoxide). One or more intelligent, multi-sensing, network-connected entryway interface devices 106, which can be termed a "smart doorbell", can detect a person's approach to or departure from a location, control audible functionality, announce a person's approach or departure via audio or visual means, or control settings on a security system (e.g., to activate or deactivate the security system).

Each of a plurality of intelligent, multi-sensing, network-connected wall light switches 108 can detect ambient lighting conditions, detect room-occupancy states and control a power and/or dim state of one or more lights. In some instances, light switches 108 can further or alternatively control a power state or speed of a fan, such as a ceiling fan. Each of a plurality of intelligent, multi-sensing, network-connected wall plug interfaces 110 can detect occupancy of a room or enclosure and control supply of power to one or more wall plugs (e.g., such that power is not supplied to the plug if nobody is at home). The smart home may further include a plurality of intelligent, multi-sensing, network-connected appliances 112, such as refrigerators, stoves and/or ovens, televisions, washers, dryers, lights (inside and/or outside the structure 150), stereos, intercom systems, garage-door openers, floor fans, ceiling fans, whole-house fans, wall air conditioners, pool heaters 114, irrigation systems 116, security systems (including security system components such as cameras, motion detectors and window/door sensors), and so forth. While descriptions of FIG. 1 can identify specific sensors and functionalities associated with specific devices, it will be appreciated that any of a variety of sensors and functionalities (such as those described throughout the specification) can be integrated into the device.

In addition to containing processing and sensing capabilities, each of the devices 102, 104, 106, 108, 110, 112, 114 and 116 can be capable of data communications and information sharing with any other of the devices 102, 104, 106, 108, 110, 112, 114 and 116, as well as to any cloud server or any other device that is network-connected anywhere in the world. The devices can send and receive communications via any of a variety of custom or standard wireless protocols (Wi-Fi, ZigBee, 6LoWPAN, Thread, Bluetooth, BLE, HomeKit Accessory Protocol (HAP), Weave, etc.) and/or any of a variety of custom or standard wired protocols (CAT6 Ethernet, HomePlug, etc.). The wall plug interfaces 110 can serve as wireless or wired repeaters, and/or can function as bridges between (i) devices plugged into AC outlets and communicating using Homeplug or other power line protocol, and (ii) devices that not plugged into AC outlets.

For example, a first device can communicate with a second device via a wireless router 160. A device can further communicate with remote devices via a connection to a network, such as the Internet 162. Through the Internet 162, the device can communicate with a central server or a cloud-computing system 164. The central server or cloud-computing system 164 can be associated with a manufacturer, support entity or service provider associated with the device. For one embodiment, a user may be able to contact customer support using a device itself rather than needing to use other communication means such as a telephone or Internet-connected computer. Further, software updates can be automatically sent from the central server or cloud-computing system 164 to devices (e.g., when available, when purchased, or at routine intervals).

By virtue of network connectivity, one or more of the smart-home devices of FIG. 1 can further allow a user to interact with the device even if the user is not proximate to the device. For example, a user can communicate with a device using a computer (e.g., a desktop computer, laptop computer, or tablet) or other portable electronic device (e.g., a smartphone). A webpage or app can be configured to receive communications from the user and control the device based on the communications and/or to present information about the device's operation to the user. For example, the user can view a current setpoint temperature for a device and adjust it using a computer. The user can be in the structure during this remote communication or outside the structure.

The smart home also can include a variety of non-communicating legacy appliances 140, such as old conventional washer/dryers, refrigerators, and the like which can be controlled, albeit coarsely (ON/OFF), by virtue of the wall plug interfaces 110. The smart home can further include a variety of partially communicating legacy appliances 142, such as IR-controlled wall air conditioners or other IR-controlled devices, which can be controlled by IR signals provided by the hazard detection units 104 or the light switches 108.

Figure 2:
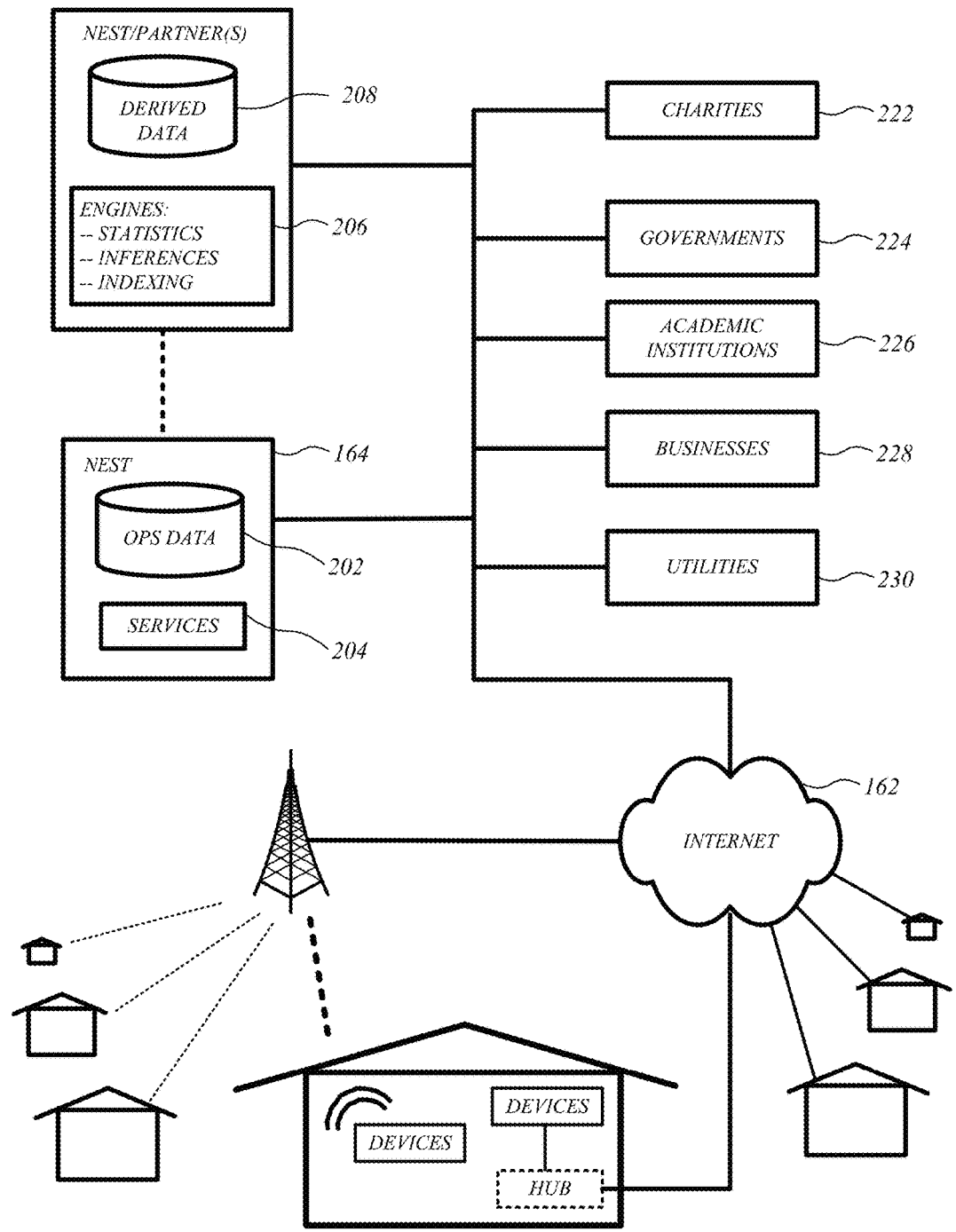
FIG. 2 illustrates a network-level view of an extensible devices and services platform with which the smart home of FIG. 1 can be integrated, according to some embodiments.

FIG. 2 illustrates a network-level view of an extensible devices and services platform with which the smart home of FIG. 1 can be integrated, according to some embodiments. Each of the intelligent, network-connected devices from FIG. 1 can communicate with one or more remote central servers or cloud computing systems 164. The communication can be enabled by establishing connection to the Internet 162 either directly (for example, using 3G/4G connectivity to a wireless carrier), though a hubbed network (which can be scheme ranging from a simple wireless router, for example, up to and including an intelligent, dedicated whole-home control node), or through any combination thereof.

The central server or cloud-computing system 164 can collect operation data 202 from the smart home devices. For example, the devices can routinely transmit operation data or can transmit operation data in specific instances (e.g., when requesting customer support). The central server or cloud-computing architecture 164 can further provide one or more services 204. The services 204 can include, e.g., software update, customer support, sensor data collection/logging, remote access, remote or distributed control, or use suggestions (e.g., based on collected operation data 204 to improve performance, reduce utility cost, etc.). Data associated with the services 204 can be stored at the central server or cloud-computing system 164 and the central server or cloud-computing system 164 can retrieve and transmit the data at an appropriate time (e.g., at regular intervals, upon receiving request from a user, etc.).

One salient feature of the described extensible devices and services platform, as illustrated in FIG. 2, is a processing engines 206, which can be concentrated at a single server or distributed among several different computing entities without limitation. Processing engines 206 can include engines configured to receive data from a set of devices (e.g., via the Internet or a hubbed network), to index the data, to analyze the data and/or to generate statistics based on the analysis or as part of the analysis. The analyzed data can be stored as derived data 208. Results of the analysis or statistics can thereafter be transmitted back to a device providing ops data used to derive the results, to other devices, to a server providing a webpage to a user of the device, or to other non-device entities. For example, use statistics, use statistics relative to use of other devices, use patterns, and/or statistics summarizing sensor readings can be transmitted. The results or statistics can be provided via the Internet 162. In this manner, processing engines 206 can be configured and programmed to derive a variety of useful information from the operational data obtained from the smart home. A single server can include one or more engines.

The derived data can be highly beneficial at a variety of different granularities for a variety of useful purposes, ranging from explicit programmed control of the devices on a per-home, per-neighborhood, or per-region basis (for example, demand-response programs for electrical utilities), to the generation of inferential abstractions that can assist on a per-home basis (for example, an inference can be drawn that the homeowner has left for vacation and so security detection equipment can be put on heightened sensitivity), to the generation of statistics and associated inferential abstractions that can be used for government or charitable purposes. For example, processing engines 206 can generate statistics about device usage across a population of devices and send the statistics to device users, service providers or other entities (e.g., that have requested or may have provided monetary compensation for the statistics). As specific illustrations, statistics can be transmitted to charities 222, governmental entities 224 (e.g., the Food and Drug Administration or the Environmental Protection Agency), academic institutions 226 (e.g., university researchers), businesses 228 (e.g., providing device warranties or service to related equipment), or utility companies 230. These entities can use the data to form programs to reduce energy usage, to preemptively service faulty equipment, to prepare for high service demands, to track past service performance, etc., or to perform any of a variety of beneficial functions or tasks now known or hereinafter developed.

Figure 3:
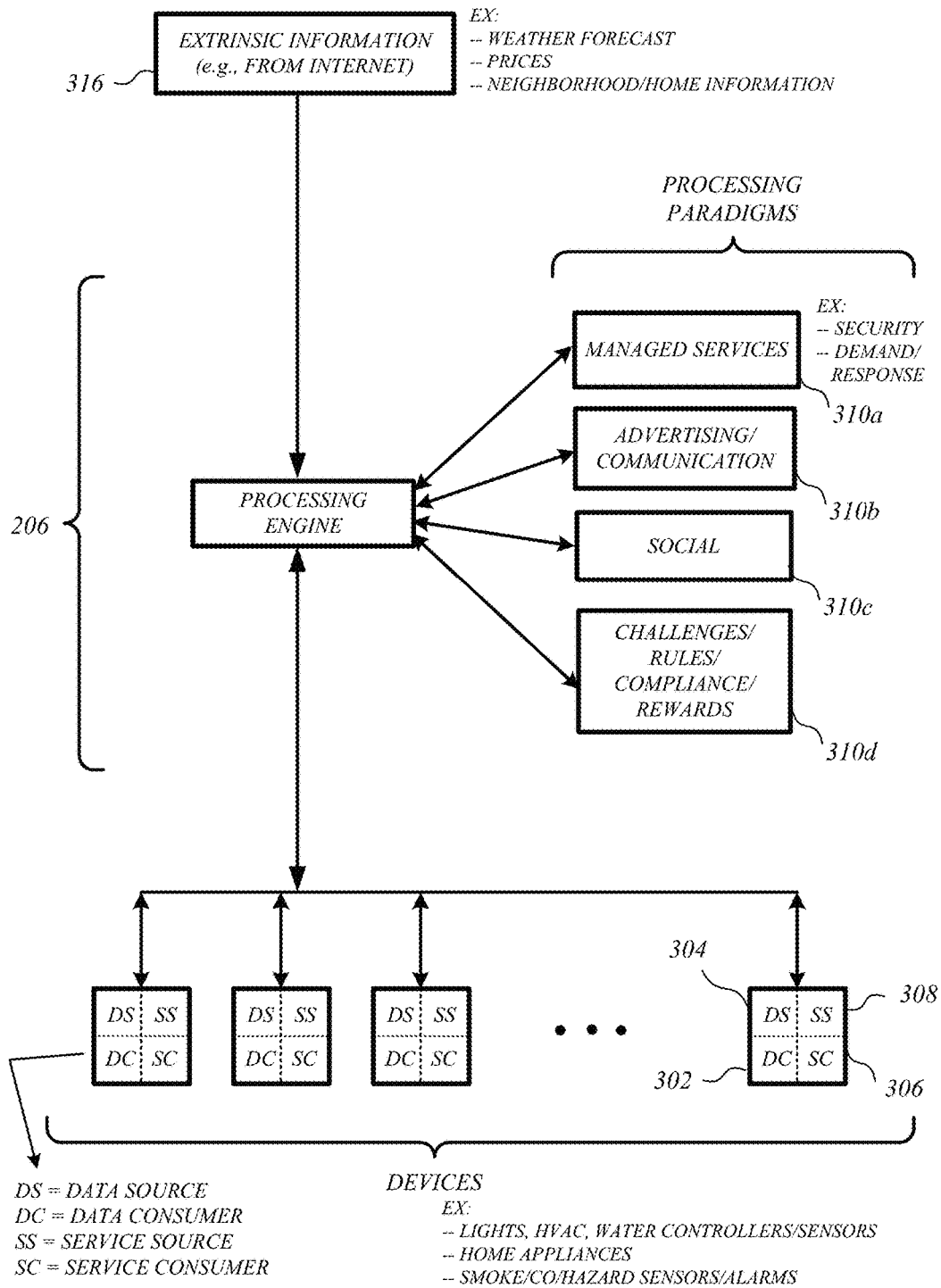
FIG. 3 illustrates an abstracted functional view of the extensible devices and services platform of FIG. 2, according to some embodiments.

FIG. 3 illustrates an abstracted functional view of the extensible devices and services platform of FIG. 2, with particular reference to the processing engine 206 as well as the devices of the smart home. Even though the devices situated in the smart home will have an endless variety of different individual capabilities and limitations, they can all be thought of as sharing common characteristics in that each of them is a data consumer 302 (DC), a data source 304 (DS), a services consumer 306 (SC), and a services source 308 (SS). Advantageously, in addition to providing the essential control information needed for the devices to achieve their local and immediate objectives, the extensible devices and services platform can also be configured to harness the large amount of data that is flowing out of these devices. In addition to enhancing or optimizing the actual operation of the devices themselves with respect to their immediate functions, the extensible devices and services platform can also be directed to "repurposing" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

For example, FIG. 3 shows processing engine 206 as including a number of paradigms 310. Processing engine 206 can include a managed services paradigm 310a that monitors and manages primary or secondary device functions. The device functions can include ensuring proper operation of a device given user inputs, estimating that (e.g., and responding to) an intruder is or is attempting to be in a dwelling, detecting a failure of equipment coupled to the device (e.g., a light bulb having burned out), implementing or otherwise responding to energy demand response events, or alerting a user of a current or predicted future event or characteristic. Processing engine 206 can further include an advertising/communication paradigm 310b that estimates characteristics (e.g., demographic information), desires and/or products of interest of a user based on device usage. Services, promotions, products or upgrades can then be offered or automatically provided to the user. Processing engine 206 can further include a social paradigm 310c that uses information from a social network, provides information to a social network (for example, based on device usage), processes data associated with user and/or device interactions with the social network platform. For example, a user's status as reported to their trusted contacts on the social network could be updated to indicate when they are home based on light detection, security system inactivation or device usage detectors. As another example, a user may be able to share device-usage statistics with other users. Processing engine 206 can include a challenges/rules/compliance/rewards paradigm 310d that informs a user of challenges, rules, compliance regulations and/or rewards and/or that uses operation data to determine whether a challenge has been met, a rule or regulation has been complied with and/or a reward has been earned. The challenges, rules or regulations can relate to efforts to conserve energy, to live safely (e.g., reducing exposure to toxins or carcinogens), to conserve money and/or equipment life, to improve health, etc.

Processing engine can integrate or otherwise utilize extrinsic information 316 from extrinsic sources to improve the functioning of one or more processing paradigms. Extrinsic information 316 can be used to interpret operational data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, etc., to identify statistical or environmental conditions, trends or other information associated with a home or neighborhood, and so forth.

An extraordinary range and variety of benefits can be brought about by, and fit within the scope of, the described extensible devices and services platform, ranging from the ordinary to the profound. Thus, in one "ordinary" example, each bedroom of the smart home can be provided with a smoke/fire/CO alarm that includes an occupancy sensor, wherein the occupancy sensor is also capable of inferring (e.g., by virtue of motion detection, facial recognition, audible sound patterns, etc.) whether the occupant is asleep or awake. If a serious fire event is sensed, the remote security/monitoring service or fire department is advised of how many occupants there are in each bedroom, and whether those occupants are still asleep (or immobile) or whether they have properly evacuated the bedroom. While this is, of course, a very advantageous capability accommodated by the described extensible devices and services platform, there can be substantially more "profound" examples that can truly illustrate the potential of a larger "intelligence" that can be made available. By way of perhaps a more "profound" example, the same data bedroom occupancy data that is being used for fire safety can also be "repurposed" by the processing engine 206 in the context of a social paradigm of neighborhood child development and education. Thus, for example, the same bedroom occupancy and motion data discussed in the "ordinary" example can be collected and made available for processing (properly anonymized) in which the sleep patterns of schoolchildren in a particular ZIP code can be identified and tracked. Localized variations in the sleeping patterns of the schoolchildren may be identified and correlated, for example, to different nutrition programs in local schools.

Figure 4:
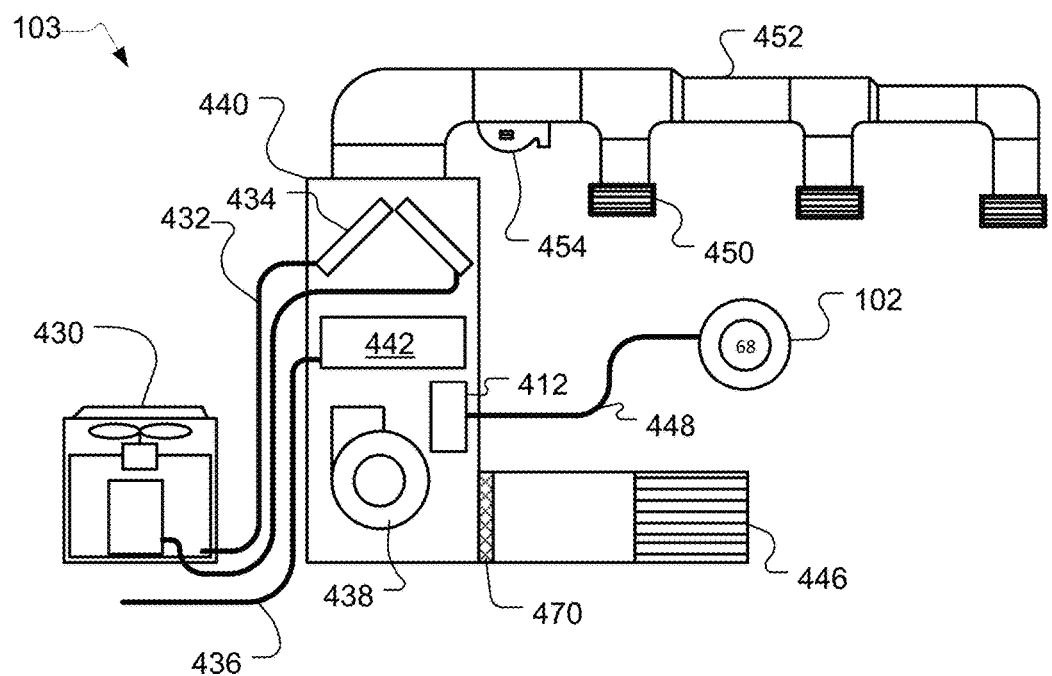
FIG. 4 illustrates a schematic diagram of an HVAC system, according to some embodiments.

FIG. 4 is a schematic diagram of an HVAC system, according to some embodiments. HVAC system 103 provides heating, cooling, ventilation, and/or air handling for an enclosure, such as structure 150 depicted in FIG. 1. System 103 depicts a forced air type heating and cooling system, although according to other embodiments, other types of HVAC systems could be used such as radiant heat based systems, heat-pump based systems, and others.

For carrying out the heating function, heating coils or elements 442 within air handler 440 provide a source of heat using electricity or gas via line 436. Cool air is drawn from the enclosure via return air duct 446 through filter 470, using fan 438 and is heated through heating coils or elements 442. The heated air flows back into the enclosure at one or more locations via supply air duct system 452 and supply air registers such as register 450. In cooling, an outside compressor 430 passes a refrigerant gas through a set of heat exchanger coils and then through an expansion valve. The gas then goes through line 432 to the cooling coils or evaporator coils 434 in the air handler 440 where it expands, cools and cools the air being circulated via fan 438. A humidifier 454 may optionally be included in various embodiments that returns moisture to the air before it passes through duct system 452. Although not shown in FIG. 4, alternate embodiments of HVAC system 103 may have other functionality such as venting air to and from the outside, one or more dampers to control airflow within the duct system 452 and an emergency heating unit. Overall operation of HVAC system 103 is selectively actuated by control electronics 412 communicating with thermostat 102 over control wires 448.

The Smart-Home Thermostat

Figure 5A:
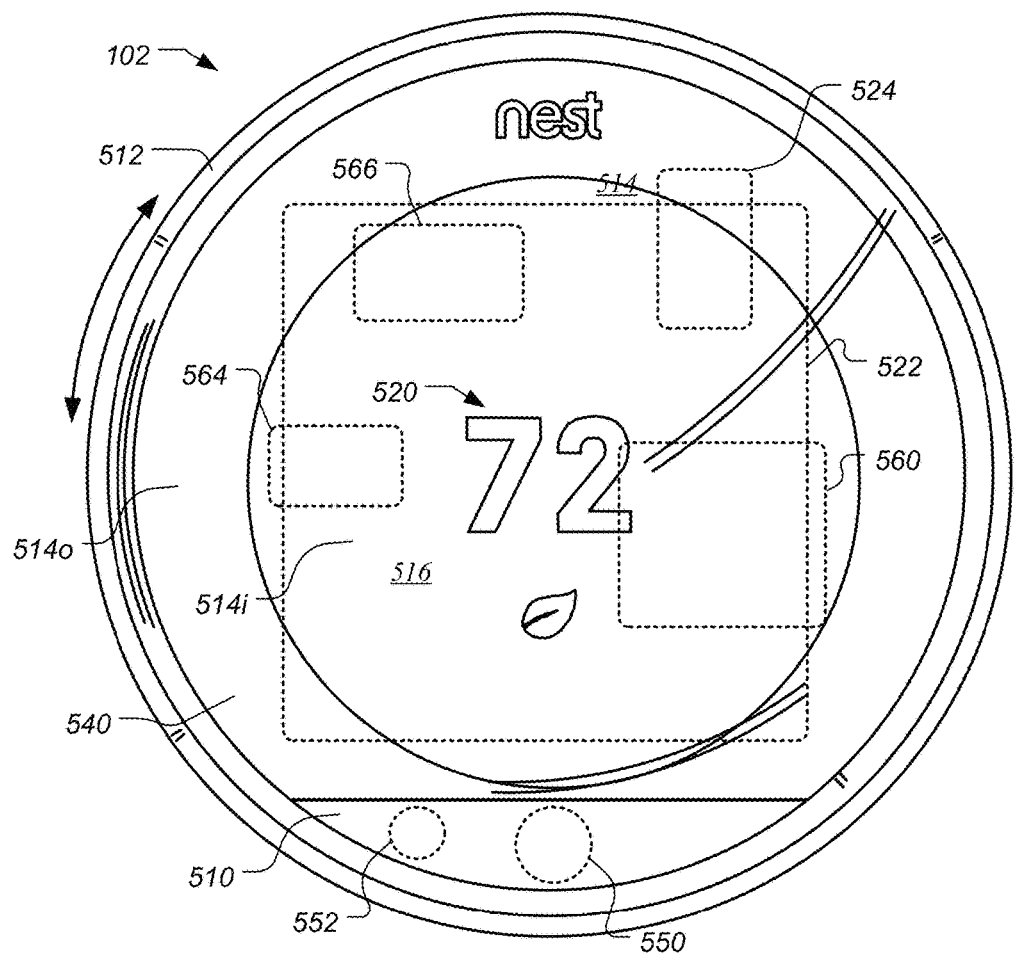
FIG. 5A-5D illustrate a thermostat having a visually pleasing, smooth, sleek and rounded exterior appearance while at the same time including one or more sensors for detecting occupancy and/or users, according to some embodiments.
Figure 5B:
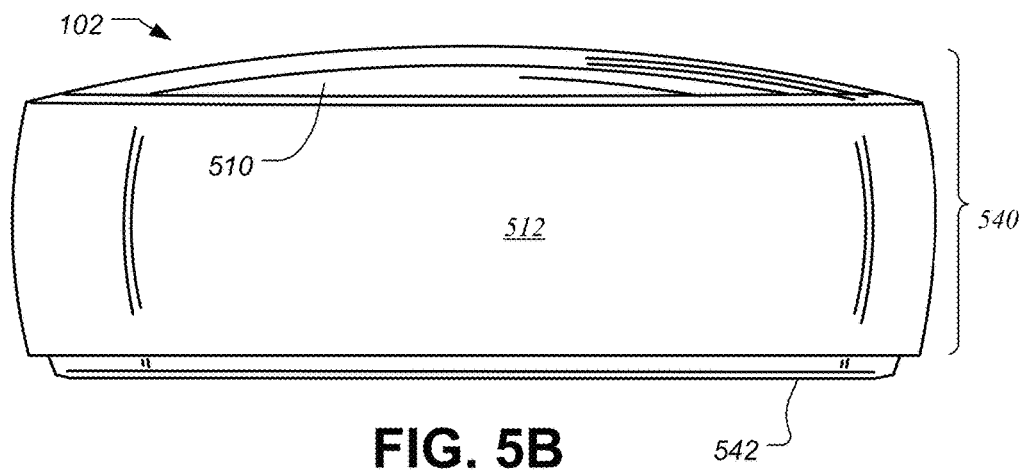
Figure 5C:
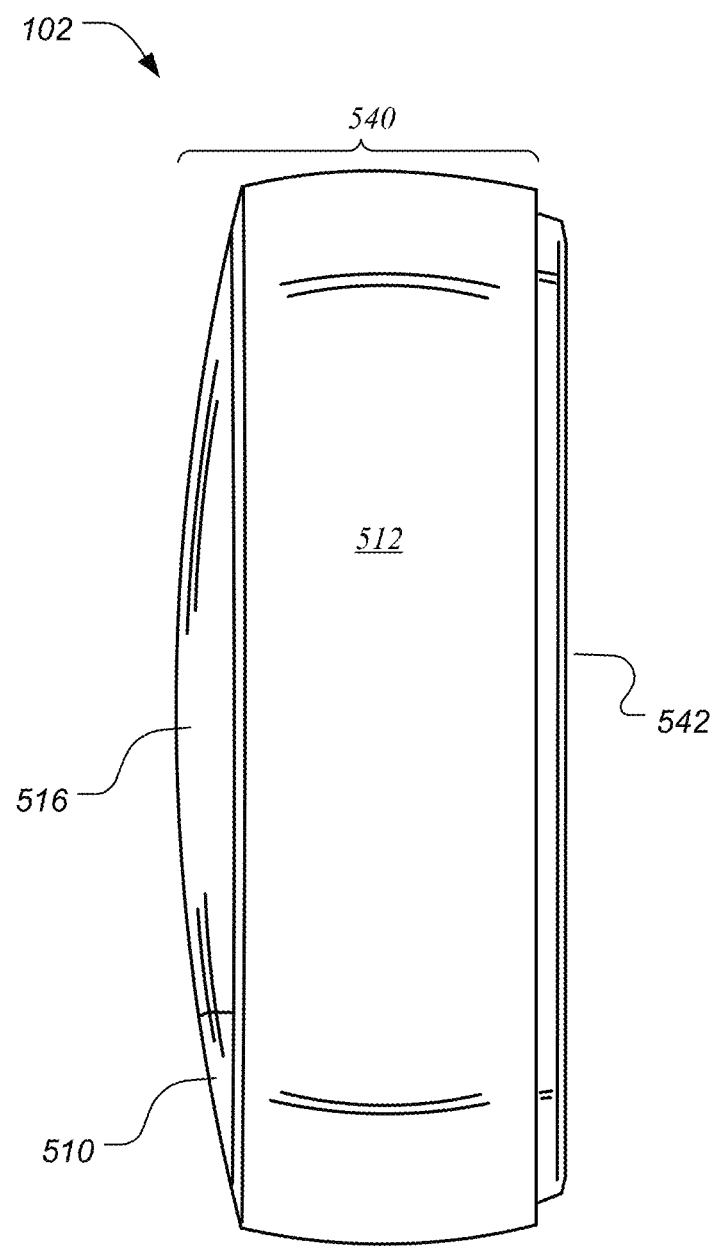
Figure 5D:
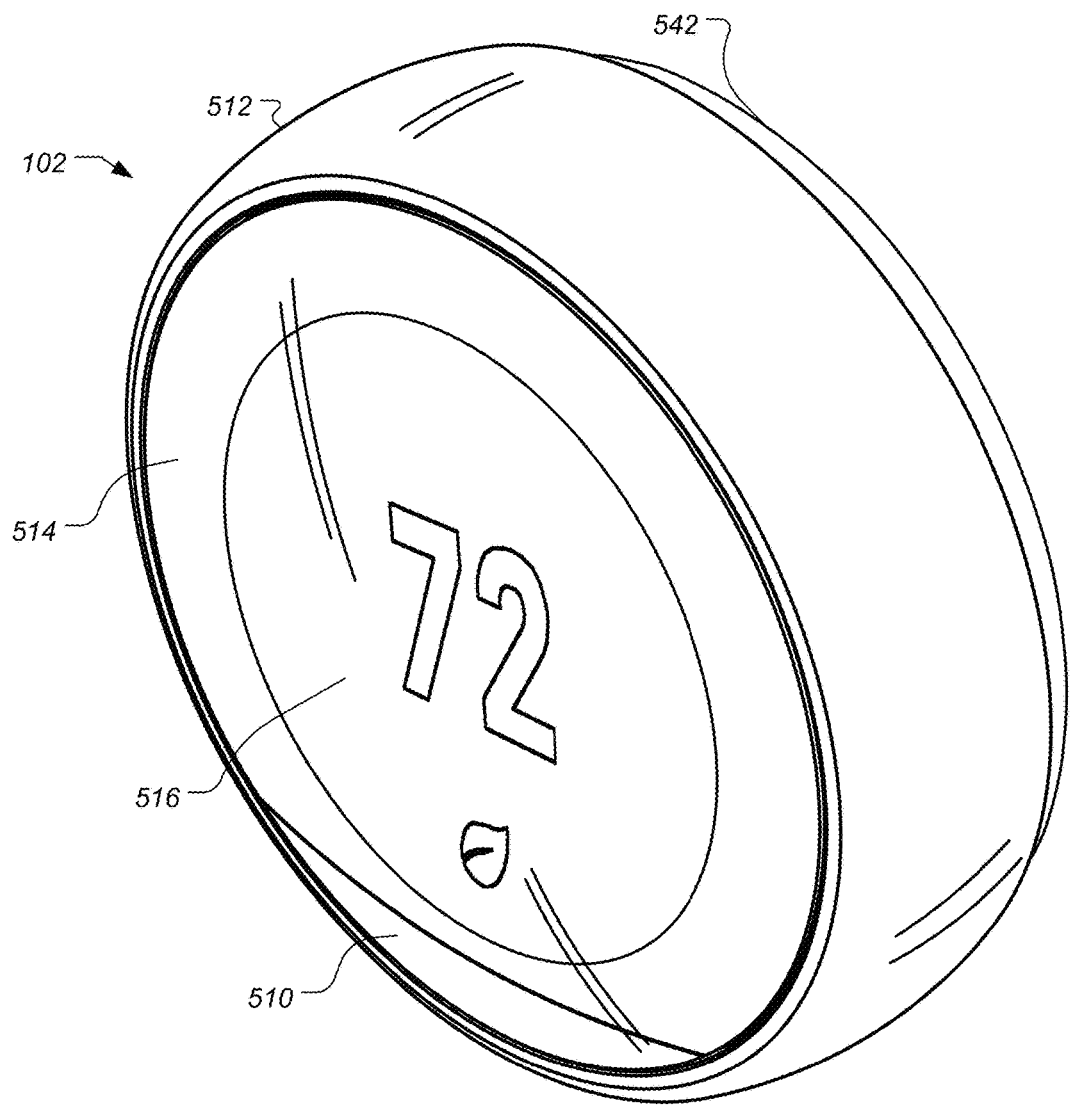

FIGS. 5A-5D illustrate a thermostat having a rounded exterior appearance and including one or more sensors for detecting environmental conditions, such as occupancy and/or users, temperature, ambient light, humidity, and so forth. FIG. 5A is front view, FIG. 5B is a bottom elevation, FIG. 5C is a right side elevation, and FIG. 5D is perspective view of thermostat 102. Unlike many prior art thermostats, thermostat 102 has a simple and elegant design. Moreover, user interaction with thermostat 102 is facilitated and greatly enhanced over known conventional thermostats. The thermostat 102 includes control circuitry and is electrically connected to an HVAC system 103, such as is shown in FIGS. 1-4. Thermostat 102 is wall mountable, is circular in shape, and has an outer rotatable ring 512 for receiving user input. Thermostat 102 has a large convex rounded front face lying inside the outer rotatable ring 512. According to some embodiments, thermostat 102 is approximately 84 mm in diameter and protrudes from the wall, when wall mounted, by 30 mm. The outer rotatable ring 512 allows the user to make adjustments, such as selecting a new setpoint temperature. For example, by rotating the outer ring 512 (also referred to as metallic ring 1410, such as in relation to FIG. 14) clockwise, the real-time (i.e. currently active) setpoint temperature can be increased, and by rotating the outer ring 512 counter-clockwise, the real-time setpoint temperature can be decreased.

The front face of the thermostat 102 comprises a cover 514 (also referred to also cover 1420, such as in relation to FIG. 14) that according to some embodiments is polycarbonate, and a lens 510 having an outer shape that matches the contours of the curved outer front face of the thermostat 102. According to some embodiments, Fresnel lens elements may are formed on the interior surface of the lens 510 such that they are not obviously visible by viewing the exterior of the thermostat 102. Behind the lens 510 is a passive infrared (PIR) sensor 550 for detecting occupancy, a temperature sensor that is thermally coupled to the lens 510, and a multi-channel thermopile for detecting occupancy, user approaches, and motion signatures. The Fresnel lens elements of the lens 510 are made from a high-density polyethylene (HDPE) that has an infrared transmission range appropriate for sensitivity to human bodies. The lens 510 may also include thin sections that allow a near-field proximity sensor 552, such as a multi-channel thermopile, and a temperature sensor to "see-through" the lens 510 with minimal interference from the polyethylene. As shown in FIGS. 5A-5D, the front edge of the outer rotatable ring 512, cover 514, and lens 510 are shaped such that they together form an integrated convex rounded front face that has a common outward arc or spherical shape arcing outward.

Although being formed from a single lens-like piece of material such as polycarbonate, the cover 514 has two different regions or portions including an outer portion 514o and a central portion 514i. According to some embodiments, the cover 514 is darkened around the outer portion 514o, but leaves the central portion 514i visibly clear so as to facilitate viewing of an electronic display 516 disposed underneath. According to some embodiments, the cover 514 acts as a lens that tends to magnify the information being displayed in electronic display 516 to users. According to some embodiments the central electronic display 516 is a dot-matrix layout (i.e. individually addressable) such that arbitrary shapes can be generated. According to some embodiments, electronic display 516 is a backlit, color liquid crystal display (LCD). An example of information displayed on the electronic display 516 is illustrated in FIG. 5A, and includes central numerals 520 that are representative of a current setpoint temperature. The thermostat 102 may be constructed such that the electronic display 516 is at a fixed orientation and does not rotate with the outer rotatable ring 512. For some embodiments, the cover 514 and lens 510 also remain at a fixed orientation and do not rotate with the outer ring 512. In alternative embodiments, the cover 514 and/or the lens 510 can rotate with the outer rotatable ring 512. According to one embodiment in which the diameter of the thermostat 102 is about 84 mm, the diameter of the electronic display 516 is about 54 mm. According to some embodiments the curved shape of the front surface of thermostat 102, which is made up of the cover 514, the lens 510 and the front facing portion of the ring 512, is spherical, and matches a sphere having a radius of between 100 mm and 180 mm. According to some embodiments, the radius of the spherical shape of the thermostat front is about 156 mm.

Motion sensing with PIR sensor 550 as well as other techniques can be used in the detection and/or prediction of occupancy. According to some embodiments, occupancy information is used in generating an effective and efficient scheduled program. A second near-field proximity sensor 552 is also provided to detect an approaching user. The near-field proximity sensor 552 can be used to detect proximity in the range of up to 10-15 feet. the PIR sensor 550 and/or the near-field proximity sensor 552 can detect user presence such that the thermostat 102 can initiate "waking up" and/or providing adaptive screen displays that are based on user motion/position when the user is approaching the thermostat and prior to the user touching the thermostat. Such use of proximity sensing is useful for enhancing the user experience by being "ready" for interaction as soon as, or very soon after the user is ready to interact with the thermostat. Further, the wake-up-on-proximity functionality also allows for energy savings within the thermostat by "sleeping" when no user interaction is taking place our about to take place.

According to some embodiments, the thermostat 102 may be controlled by at least two types of user input, the first being a rotation of the outer rotatable ring 512 as shown in FIG. 5A, and the second being an inward push on head unit 540 until an audible and/or tactile "click" occurs. For such embodiments, the head unit 540 is an assembly that includes the outer ring 512, the cover 514, the electronic display 516, and the lens 510. When pressed inwardly by the user, the head unit 540 travels inwardly by a small amount, such as 0.5 mm, against an interior switch (not shown), and then springably travels back out when the inward pressure is released, providing a tactile "click" along with a corresponding audible clicking sound. Thus, for the embodiment of FIGS. 5A-5D, an inward click can be achieved by direct pressing on the outer rotatable ring 512 itself, or by indirect pressing of the outer rotatable ring 512 by virtue of providing inward pressure on the cover 514, the lens 510, or by various combinations thereof. For other embodiments, the thermostat 102 can be mechanically configured such that only the outer ring 512 travels inwardly for the inward click input, while the cover 514 and lens 510 remain motionless.

FIG. 5B and FIG. 5C are bottom and right side elevation views of the thermostat 102. According to some embodiments, the thermostat 102 includes a processing system 560, display driver 564 and a wireless communications system 566. The processing system 560 is adapted to cause the display driver 564 and display 516 to display information to the user, and to receiver user input via the outer rotatable ring 512. The processing system 560, according to some embodiments, is capable of carrying out the governance of the operation of thermostat 102 including various user interface features. The processing system 560 is further programmed and configured to carry out other operations, such as maintaining and updating a thermodynamic model for the enclosure in which the HVAC system is installed. According to some embodiments, a wireless communications system 566 is used to communicate with devices such as personal computers, other thermostats or HVAC system components, smart phones, local home wireless networks, routers, gateways, home appliances, security systems, hazard detectors, remote thermostat management servers, distributed sensors and/or sensor systems, and other components it the modern smart-home environment. Such communications may include peer-to-peer communications, communications through one or more servers located on a private network, or and/or communications through a cloud-based service.

According to some embodiments, the thermostat 102 includes a head unit 540 and a backplate (or wall dock) 542. Head unit 540 of thermostat 102 is slidably mountable onto back plate 542 and slidably detachable therefrom. According to some embodiments the connection of the head unit 540 to backplate 542 can be accomplished using magnets, bayonet, latches and catches, tabs, and/or ribs with matching indentations, or simply friction on mating portions of the head unit 540 and backplate 542. Also shown in FIG. 5A is a rechargeable battery 522 that is recharged using recharging circuitry 524 that uses power from backplate that is either obtained via power harvesting (also referred to as power stealing and/or power sharing) from the HVAC system control circuit(s) or from a common wire, if available. According to some embodiments, the rechargeable battery 522 may include a single cell lithium-ion battery, or a lithium-polymer battery.

Figure 6A:
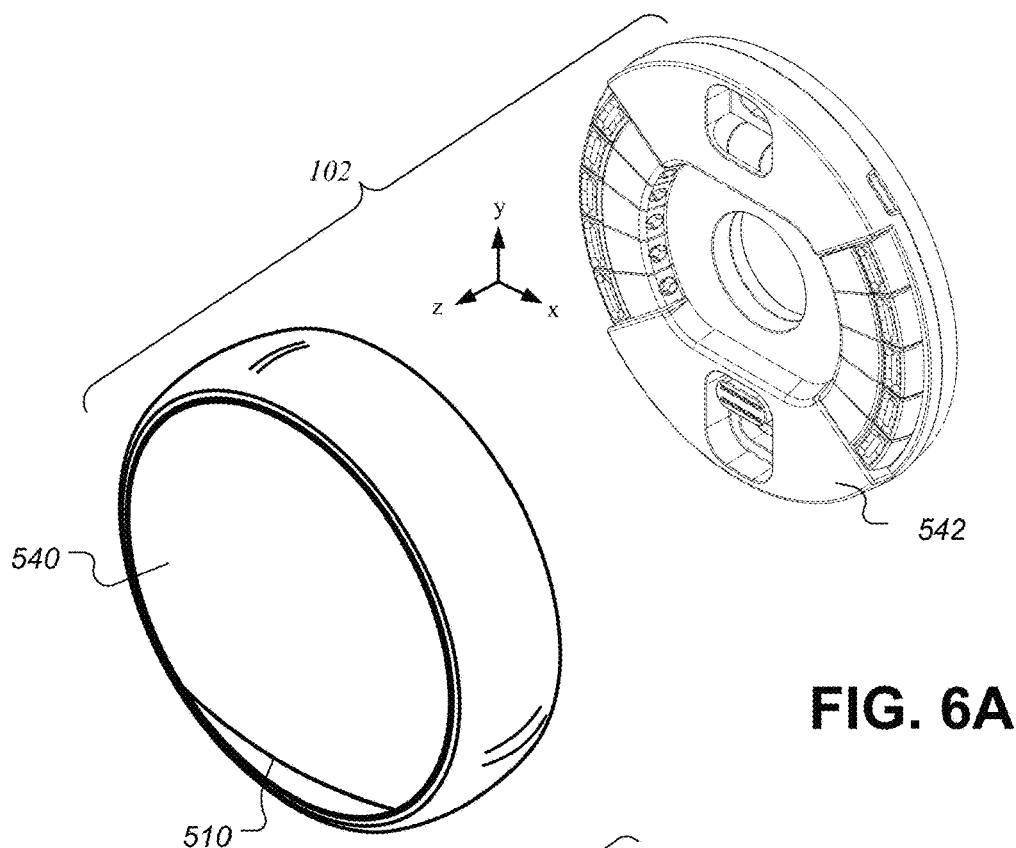
FIG. 6A-6B illustrate exploded front and rear perspective views, respectively, of a thermostat with respect to its two main components, according to some embodiments.
Figure 6B:
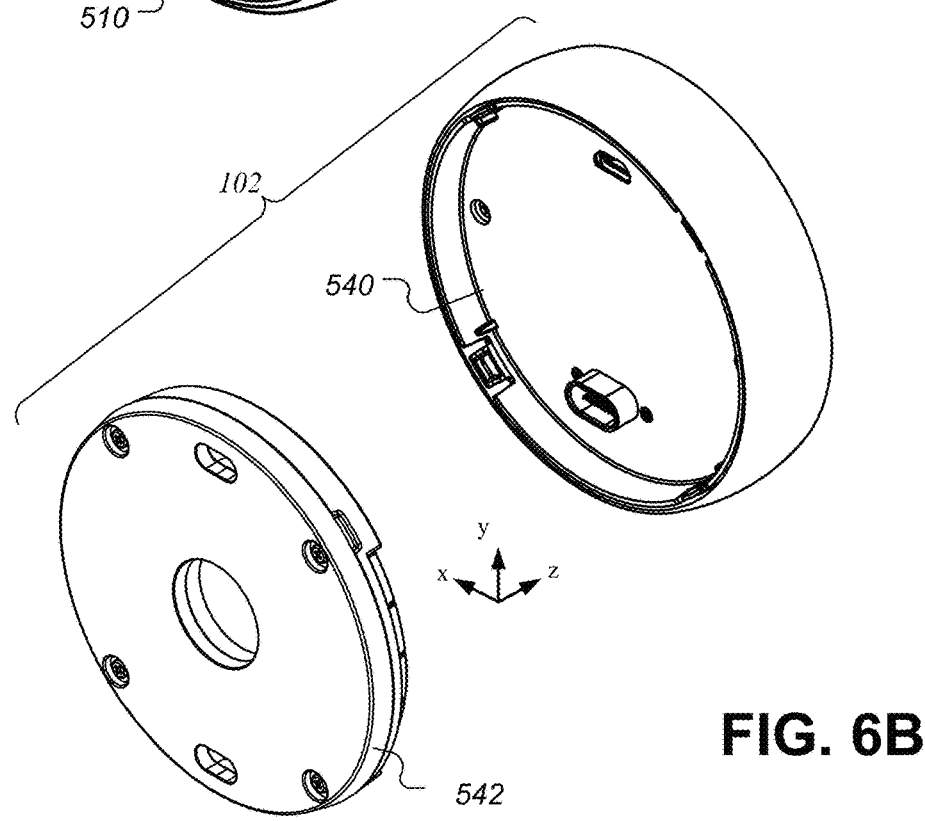

FIGS. 6A-6B illustrate exploded front and rear perspective views, respectively, of the thermostat 102 with respect to its two main components, which are the head unit 540 and the backplate 542. In the drawings shown herein, the "z" direction is outward from the wall, the "y" direction is the toe-to-head direction relative to a walk-up user, and the "x" direction is the user's left-to-right direction.

Figure 6D:
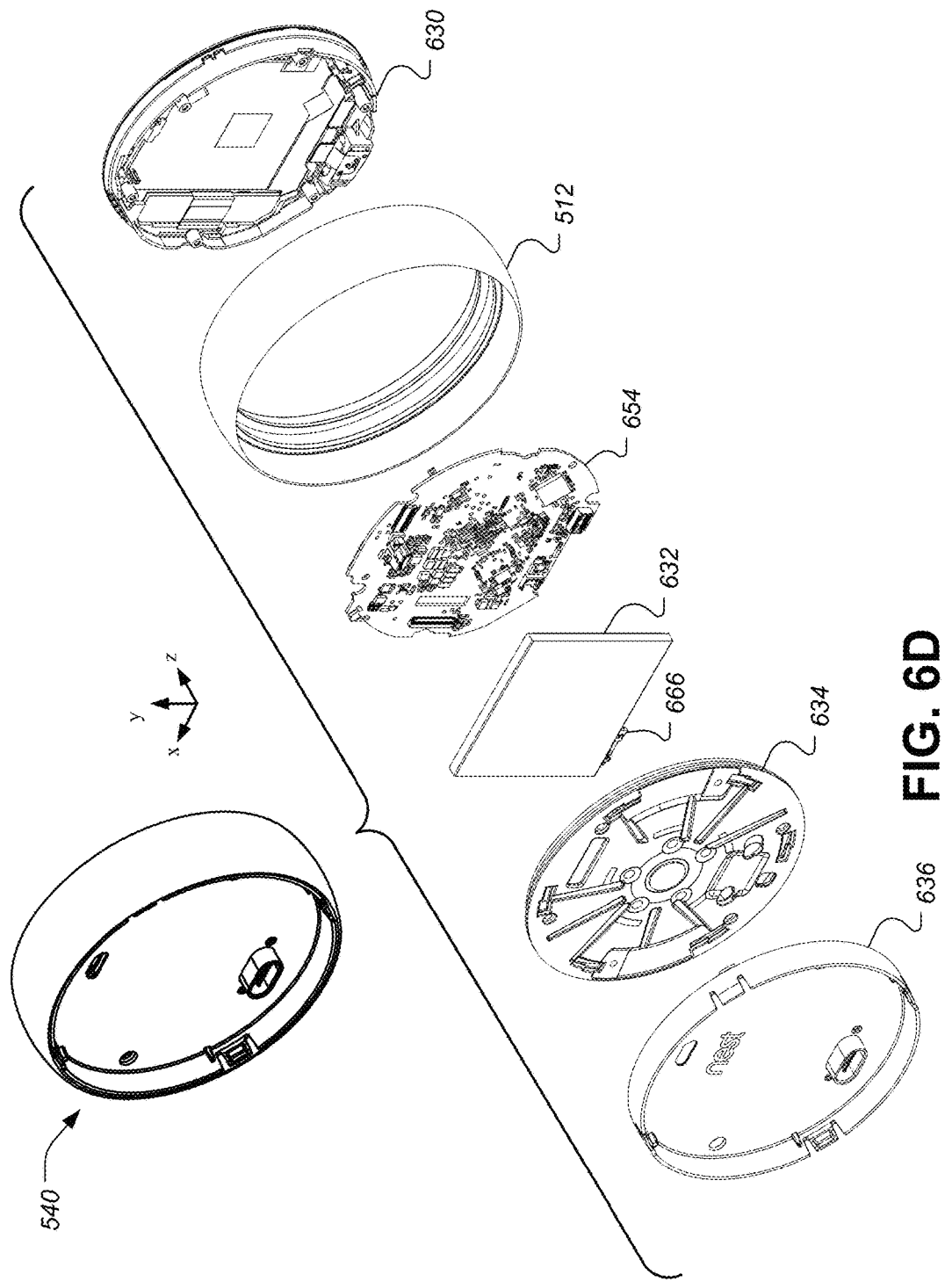

FIGS. 6C-6D illustrate exploded front and rear perspective views, respectively, of the head unit 540 with respect to its primary components. Head unit 540 includes, a back cover 636, a bottom frame 634, a battery assembly 632 with the rechargeable battery 522, a head unit printed circuit board (PCB) 654, the outer rotatable ring 512, the cover 514, and the lens 510. Behind the lens is the display assembly 630, which will be described in relation to FIGS. 6E-6F below. Electrical components on the head unit PCB 654 can connect to electrical components on the back plate 542 by virtue of a plug-type electrical connector on the back cover 636. The head unit PCB 654 is secured to head unit back cover 636 and display assembly 630. The outer rotatable ring 512 is held between a bearing surface on the display assembly 630 and bearing surfaces on the bottom frame 634. Motion of the outer rotatable ring 512 in the z direction is constrained by flat bearing surfaces on the display assembly 630 and bottom frame 634, while motion of the ring in x and y directions are constrained at least in part by circular rounded surfaces on the bottom frame 634. According to some embodiments, the bearing surfaces of the bottom frame 634 and/or the display assembly 630 are greased and/or otherwise lubricated to both smooth and dampen rotational movement for the outer ring 512. The head unit printed PCB 654 may include some or all of processing system 560, display driver 564, wireless communication system 566, and battery recharging circuitry 524 as shown and described with respect to FIG. 5A, as well as one or more additional memory storage components. According to some embodiments, circuitry and components are mounted on both sides of head unit PCB 654. Although not shown, according to some embodiments, shielding can surround circuitry and components on both sides of the head unit PCB 654.

Battery assembly 632 includes a rechargeable battery 522. Battery assembly 632 also includes connecting wires 666, and a battery mounting film that is attached to battery 522 using a strong adhesive and/or the any rear shielding of head unit PCB 654 using a relatively weaker adhesive. According to some embodiments, the battery assembly 632 is user-replaceable.

Figure 6E:
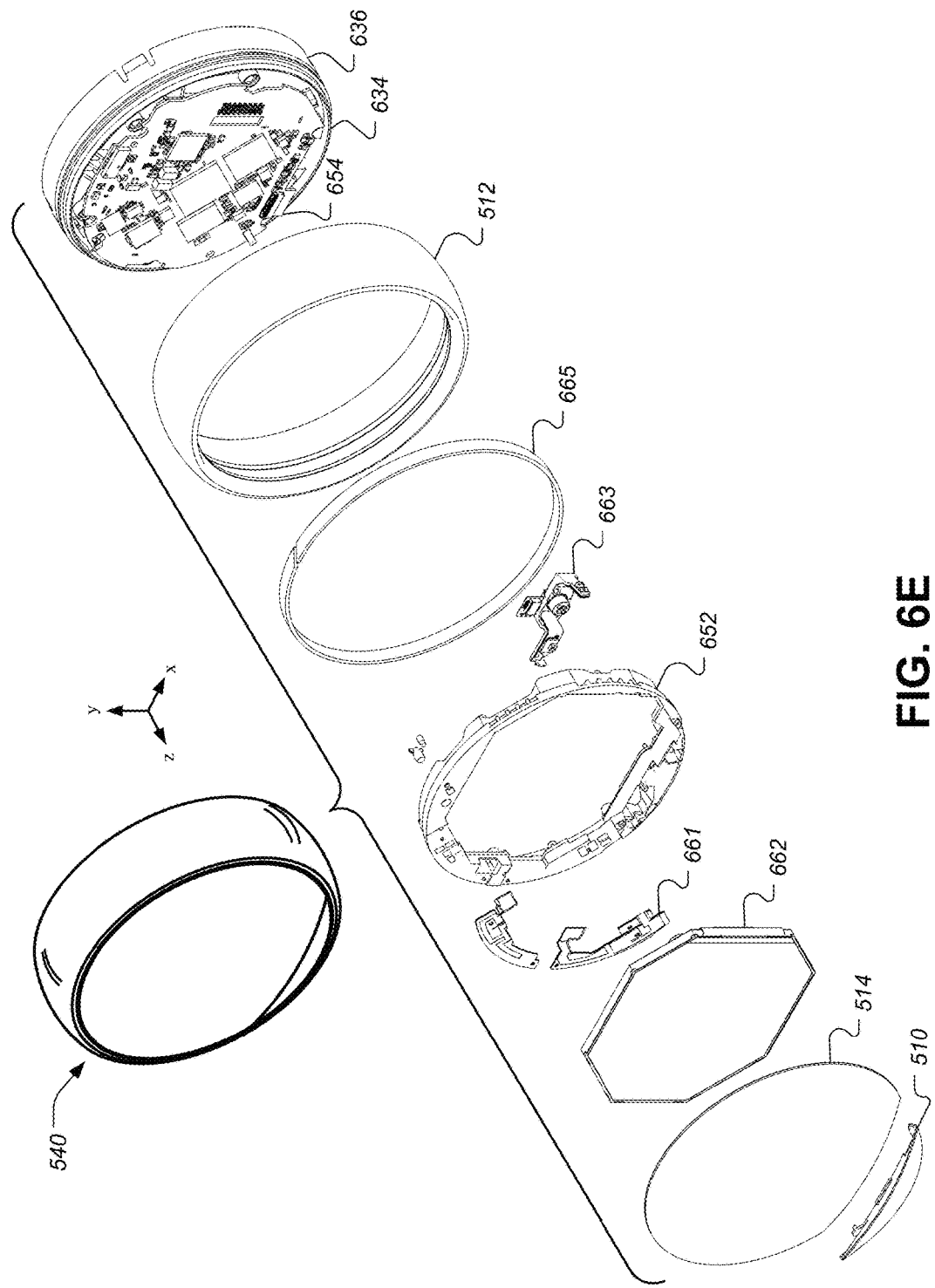
FIG. 6E-6F illustrate exploded front and rear perspective views, respectively, of a head unit display assembly with respect to its primary components, according to some embodiments.
Figure 6F:
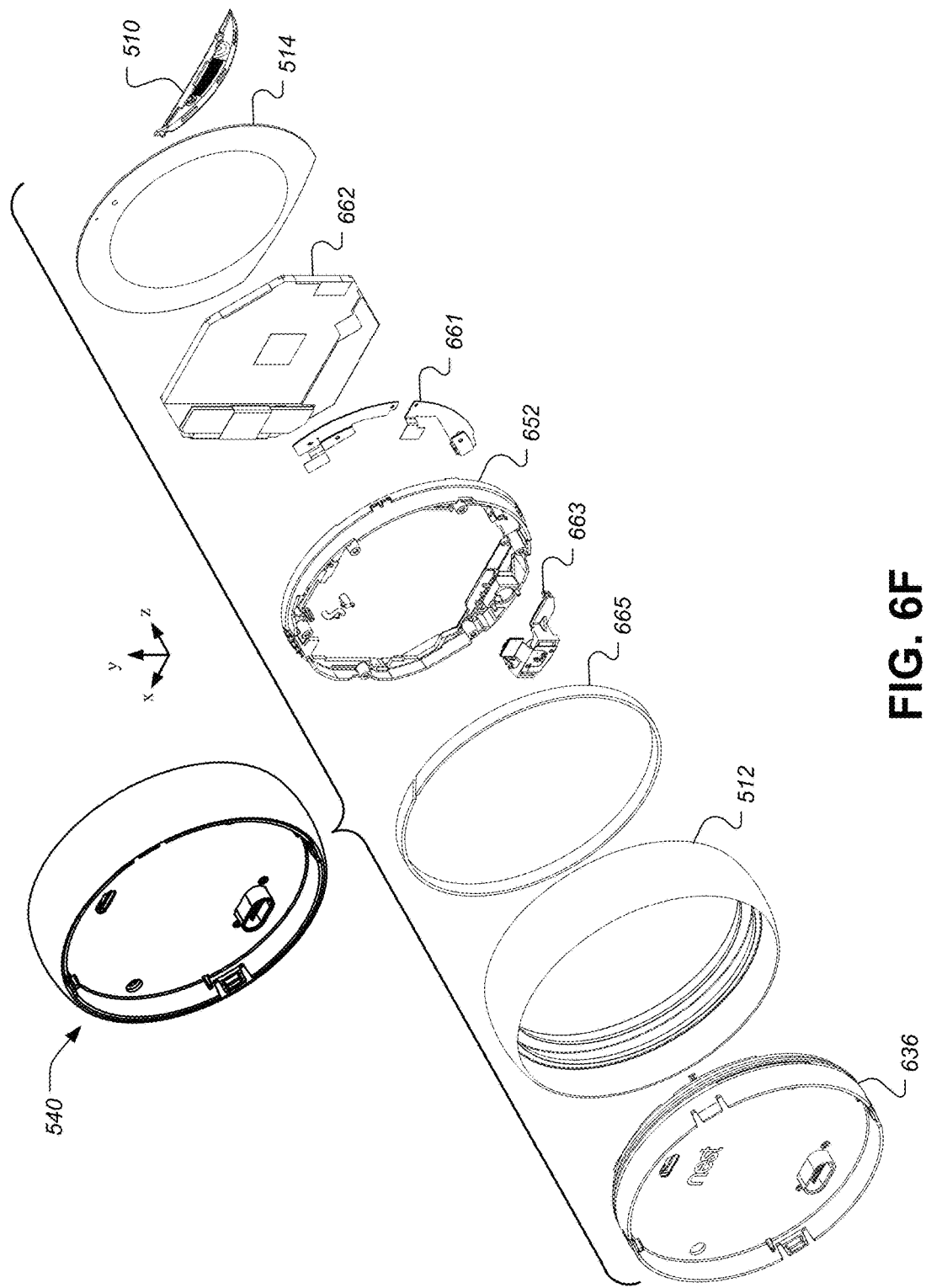

FIGS. 6E-6F illustrate exploded front and rear perspective views, respectively, of the head unit 540 with an exploded view of the display assembly 630. The display assembly 630 comprises the cover 514, the lens 510, an LCD module 662 (also referred to as electronic display module 1000, such as in relation to FIG. 10), a pair of RF antennas 661 (also referred to as antennas 810 and 820, such as in relation to FIG. 8), a head unit top frame 652 (also referred to as frame 910, such as in relation to FIG. 9), a sensor flex assembly 663, and a magnetic ring 665. The sensor flex assembly 663 connects to the head unit PCB 654 using a connector on a flexible PCB. The sensor flex assembly 663 also includes the PIR sensor 550 and the near-field proximity sensor 552. Additionally, the sensor flex assembly 663 may include a temperature sensor IC that is positioned close to the lens 515 so as to accurately measure temperature outside of the thermostat 102 without being overly affected by internal heating of thermostat components. The sensor flex assembly 663 may be comprised of these three sensors, along with a flexible PCB (including the connector for the head unit PCB 654) and a plastic bracket to which the sensors and flexible PCB are mounted. The bracket ensures that the sensor flex assembly 663 is positioned and oriented consistently and correctly with respect to the lens 510. The lens 510 includes two sections that are thinned to approximately 0.3 mm in front of the near-field proximity sensor 552 and the temperature sensor. The lens 510 also includes a section with a Fresnel lens pattern in front of the PIR sensor 550. In some embodiments, additional temperature sensors may be placed throughout the thermostat 102, such as a temperature sensor on the head unit PCB 654 and a temperature sensor on the back plate PCB 680.

The head unit PCB 554 includes a Hall effect sensor that senses rotation of the magnetic ring 665. The magnetic ring 665 is mounted to the inside of the outer rotatable ring 512 using an adhesive such that the outer rotatable ring 512 and the magnetic ring 665 are rotated together. The magnetic ring 665 includes striated sections of alternating magnetic polarity that are diagonally positioned around the magnetic ring 665. The Hall effect sensor senses the alternations between magnetic polarities as the outer ring 512 is rotated. The Hall effect sensor can be controlled by a primary processor, which is a higher powered processor, without excessive power drain implications because the primary processor will invariably be awake already when the user is manually turning the outer rotatable ring 512 to control the user interface. Advantageously, very fast response times can also be provided by the primary processor.

The antennas 661 are mounted to the top surface of the head unit top frame 652. The wireless communications system 566 may include Wi-Fi radios of various frequencies (e.g., 2.4 GHz and 5.0 GHz), along with an IEEE 802.15.4-compliant radio unit for a local-area smart home device network that may include other thermostats, hazard detectors, security system modules, and so forth. The IEEE 802.15.4 unit may use the Thread protocol for achieving such communications. In some embodiments, the wireless communications system 566 may also include a Bluetooth low energy (BLE) radio for communication with user devices.

The processing system 560 may be distributed between the head unit PCB 654 and the backplate PCB 680, and may include a primary processor and a secondary processor. The primary processor may be a comparatively high-powered processor, such as the AM3703 chip, or the MCIMX6X3EVK10AB chip from Freescale™, and may be programmed to perform sophisticated thermostat operations, such as time-to-temperature calculations, occupancy determination algorithms, ambient temperature compensation calculations, software updates, wireless transmissions, operation of the display driver 564, and regulation of the recharging circuitry 524. The secondary processor, such as the STM32L chip from ST microelectronics, may be a comparatively low-power processor when compared to the primary processor. The secondary processor may interact with the HVAC system to control a series of FET switches that control the functioning of the HVAC system. The secondary processor may also interface with various sensors in thermostat 102, such as the temperature sensors, a humidity sensor, an ambient light sensor, and/or the like. The secondary processor may also share duties with the primary processor in regulating the recharging circuitry 522 to provide power to all of the electrical systems on board the thermostat 102. Generally, the primary processor will operate in a "sleep" mode until high-power processing operations (e.g., wireless communications, user interface interactions, time-to-temperature calculations, thermal model calculations, etc.) are required, while the secondary processor will operate in an "awake" mode more often than the primary processor in order to monitor environmental sensors and wake the primary processor when needed.

FIGS. 6G-6H illustrate exploded front and rear perspective views, respectively, of the back plate unit 542 with respect to its primary components, according to some embodiments. Back plate unit 542 comprises a back plate rear plate 682, a back plate PCB 680, and a back plate cover 670. Visible in FIG. 6G are the HVAC wire connectors 684 that include integrated mechanical wire insertion sensing circuitry, and relatively large capacitors 686 that are used by part of the power stealing circuitry that is mounted on the back plate PCB 680. According to some embodiments, backplate 542 includes electronics and a temperature/humidity sensor in housing. Wire connectors 684 are provided to allow for connection to HVAC system wires, which pass though the large central circular opening 690, which is visible in each of the backplate primary components. Also visible in each of the backplate primary components are two mounting holes 692 and 694 for use in fixing the backplate to the wall. Also visible in FIGS. 6G-6H are a bubble level 672 to allow the user to install the thermostat 102 in a level position without additional tools.

The back plate PCB 680 also may include approximately seven custom power isolation ICs 685 that isolate the internal electronics of the thermostat 102 from the relatively high 24 VAC signals of the HVAC system. The power isolation ICs 685 are custom software-resettable fuses that both monitor transient and anomalous voltage/current signals on the HVAC power/return wires and switch off the connection to isolate the thermostat against any dangerous signals that could damage the internal electronics. The power isolation ICs 685 receive command signals encoded in a clock square wave from the processing system 560 to open and close a pair of power FETs for each HVAC return wire in order to activate the corresponding HVAC function (e.g., fan, air-conditioning, heat, heat pump, etc.). A complete description of the power isolation ICs 685 is given in the commonly assigned U.S. patent application Ser. No. 14/591,804 filed on Jan. 7, 2015, which is hereby incorporated herein by reference in its entirety for all purposes.

Figure 7:
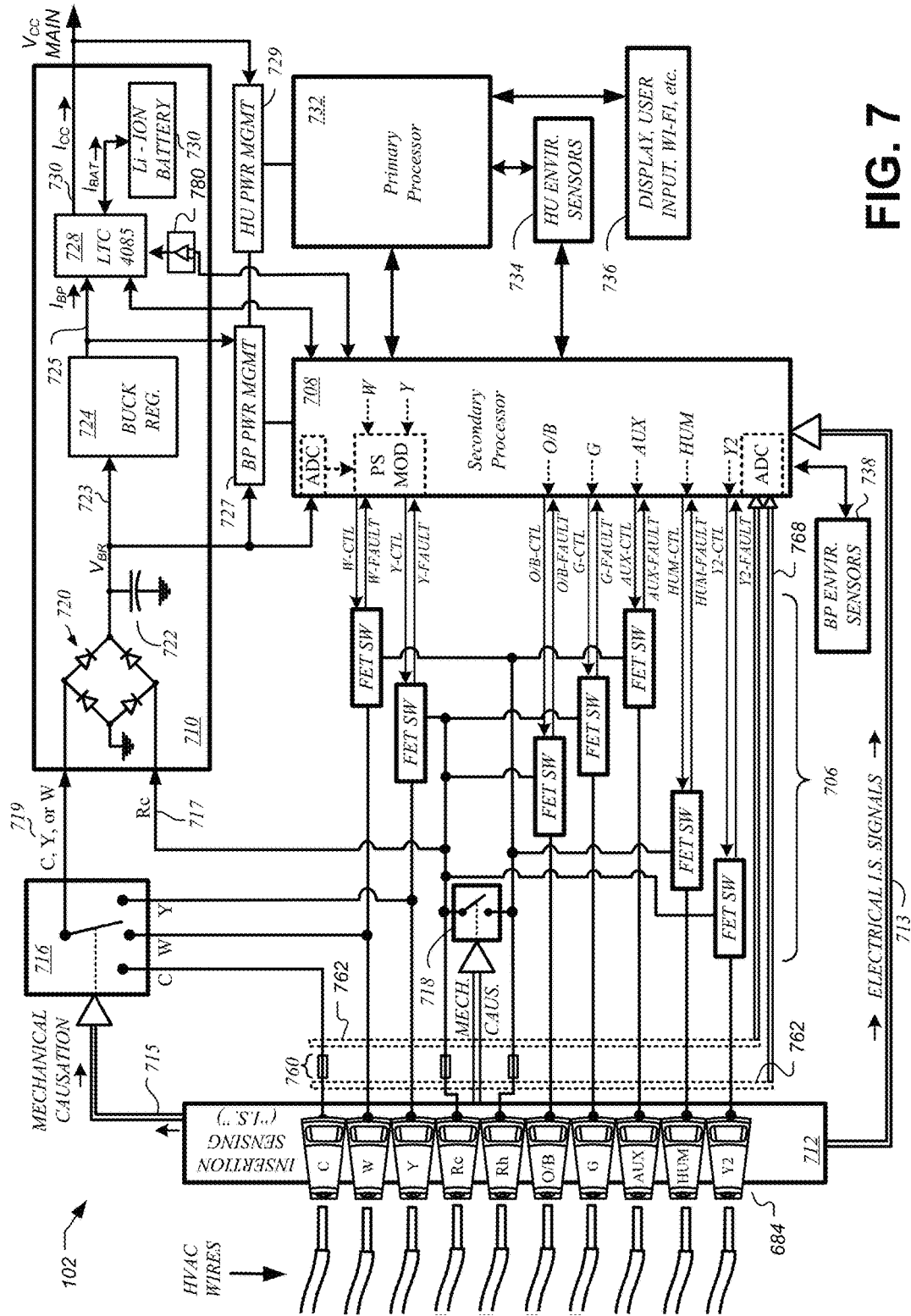
FIG. 7 illustrates a block diagram illustrating circuitry within a thermostat, according to some embodiments.

FIG. 7 illustrates a power management and power harvesting system for a smart thermostat, according to some embodiments. FIG. 7 shows connections to common HVAC wiring, such as a W (heat call relay wire); Y (cooling call relay wire); Y2 (second stage cooling call relay wire); Rh (heat call relay power); Rc (cooling call relay power); G (fan call relay wire); O/B (heat pump call relay wire); AUX (auxiliary call relay wire); HUM (humidifier call relay wire); and C (common wire). As discussed above, the thermostat 102 comprises a plurality of FET switches 706 (such as the power isolation ICs 685 of FIG. 6H above) used for carrying out the essential thermostat operations of connecting or "shorting" one or more selected pairs of HVAC wires together according to the desired HVAC operation. The operation of each of the FET switches 706 is controlled by the secondary processor 708 which can comprise, for example, an STM32L 32-bit ultra-low power ARM-based microprocessor available from ST Microelectronics.

Thermostat 102 further comprises powering circuitry 710 that comprises components contained on both the backplate 542 and head unit 540. Generally speaking, it is the purpose of powering circuitry 710 to extract electrical operating power from the HVAC wires and convert that power into a usable form for the many electrically-driven components of the thermostat 102. Thermostat 102 further comprises insertion sensing components 712 configured to provide automated mechanical and electrical sensing regarding the HVAC wires that are inserted into the thermostat 102. Thermostat 102 further comprises a relatively high-power primary processor 732, such as an AM3703 Sitara ARM microprocessor available from Texas Instruments, that provides the main general governance of the operation of the thermostat 102. Thermostat 102 further comprises environmental sensors 734/738 (e.g., temperature sensors, humidity sensors, active IR motion sensors, passive IR motion sensors, multi-channel thermopiles, ambient visible light sensors, accelerometers, ambient sound sensors, ultrasonic/infrasonic sound sensors, microwave sensors, GPS sensors, etc.), as well as other components 736 (e.g., electronic display devices and circuitry, user interface devices and circuitry, wired communications circuitry, wireless communications circuitry, etc.) that are operatively coupled to the primary processor 732 and/or secondary processor 708 and collectively configured to provide the functionalities described in the instant disclosure.

The insertion sensing components 712 include a plurality of HVAC wiring connectors 684, each containing an internal springable mechanical assembly that, responsive to the mechanical insertion of a physical wire thereinto, will mechanically cause an opening or closing of one or more dedicated electrical switches associated therewith. With respect to the HVAC wiring connectors 684 that are dedicated to the C, W, Y, Rc, and Rh terminals, those dedicated electrical switches are, in turn, networked together in a manner that yields the results that are illustrated in FIG. 7 by the blocks 716 and 718. The output of block 716, which is provided at a node 719, is dictated solely by virtue of the particular combination of C, W, and Y connectors into which wires have been mechanically inserted in accordance with the following rules: if a wire is inserted into the C connector, then the node 719 becomes the C node regardless of whether there are any wires inserted into the Y or W connectors; if no wire is inserted into the C connector and a wire is inserted into the Y connector, then the node 719 becomes the Y node regardless of whether there is a wire inserted into the W connector; and if no wire is inserted into either of the C or Y connectors, then the node 719 becomes the W node. Block 718 is shown as being coupled to the internal sensing components 712 by virtue of double lines termed "mechanical causation," for the purpose of denoting that its operation, which is either to short the Rc and Rh nodes together or not to short the Rc and Rh nodes together. Whether the block 718 will short, or not short, the Rc and Rh nodes together is dictated solely by virtue of the particular combination of Rc and Rh connectors into which wires have been mechanically inserted. Block 718 will keep the Rc and Rh nodes shorted together, unless wires have been inserted into both the Rc and Rh connectors, in which case the block 718 will not short the Rc and Rh nodes together because a two-HVAC-transformer system is present. The insertion sensing circuitry 712 is also configured to provide at least two signals to the secondary processor 708, the first being a simple "open" or "short" signal that corresponds to the mechanical insertion of a wire, and the second being a voltage or other level signal that represents a sensed electrical signal at that terminal. The first and second electrical signals for each of the respective wiring terminals can advantageously be used as a basis for basic "sanity checking" to help detect and avoid erroneous wiring conditions.

Basic operation of each of the FET switches 706 is achieved by virtue of a respective control signal (e.g., W-CTL, Y-CTL) provided by the secondary processor 708 that causes the corresponding FET switch 706 to "connect" or "short" its respective HVAC lead inputs for an ON control signal, and that causes the corresponding FET switch 706 to "disconnect" or "leave open" or "open up" its respective HVAC lead inputs for an "OFF" control signal. By virtue of the above-described operation of block 718, it is automatically the case that for single-transformer systems having only an "R" wire (rather than separate Rc and Rh wires as would be present for two-transformer systems), that "R" wire can be inserted into either of the Rc or Rh terminals, and the Rh-Rc nodes will be automatically shorted to form a single "R" node, as needed for proper operation. In contrast, for dual-transformer systems, the insertion of two separate wires into the respective Rc and Rh terminals will cause the Rh-Rc nodes to remain disconnected to maintain two separate Rc and Rh nodes, as needed for proper operation.

Referring now to the powering circuitry 710 in FIG. 7, provided is a configuration that automatically adapts to the powering situation presented to the thermostat 102 at the time of installation and thereafter. The powering circuitry 710 comprises a full-wave bridge rectifier 720, a storage and waveform-smoothing bridge output capacitor 722 (which can be, for example, on the order of 30 microfarads), a buck regulator circuit system 724, a power-and-battery (PAB) regulation circuit 728, and a rechargeable lithium-ion battery 730. In conjunction with other control circuitry including backplate power management circuitry 727, head unit power management circuitry 729, and the secondary processor 708, the powering circuitry 710 is configured and adapted to have the characteristics and functionality described hereinbelow.

By virtue of the configuration illustrated in FIG. 7, when there is a "C" wire presented upon installation, the powering circuitry 710 operates as a relatively high-powered, rechargeable-battery-assisted AC-to-DC converting power supply. When there is not a "C" wire presented, the powering circuitry 710 operates as a power-stealing, rechargeable-battery-assisted AC-to-DC converting power supply. As illustrated in FIG. 7, the powering circuitry 710 generally serves to provide the voltage Vcc MAIN that is used by the various electrical components of the thermostat 102, and that in one embodiment will usually be about 3.7V~3.95V. The general purpose of powering circuitry 710 is to convert the 24 VAC presented between the input leads 719 and 717 to a steady DC voltage output at the Vcc MAIN node to supply the thermostat electrical power load.

Operation of the powering circuitry 710 for the case in which the "C" wire is present is now described. When the 24 VAC input voltage between nodes 719 and 717 is rectified by the full-wave bridge rectifier 720, a DC voltage at node 723 is present across the bridge output capacitor 722, and this DC voltage is converted by the buck regulator system 724 to a relatively steady voltage, such as 4.4 volts, at node 725, which provides an input current $I_{BP}$ to the power-and-battery (PAB) regulation circuit 728.

The secondary processor 708 controls the operation of the powering circuitry 710 at least by virtue of control leads leading between the secondary processor 708 and the PAB regulation circuit 728, which for one embodiment can include an LTC4085-4 chip available from Linear Technologies Corporation. The LTC4085-4 is a USB power manager and Li-Ion/Polymer battery charger originally designed for portable battery-powered applications. The PAB regulation circuit 728 provides the ability for the secondary processor 708 to specify a maximum value $I_{BP}$(max) for the input current $I_{BP}$. The PAB regulation circuit 728 is configured to keep the input current at or below $I_{BP}$(max), while also providing a steady output voltage Vcc, such as 4.0 volts, while also providing an output current Icc that is sufficient to satisfy the thermostat electrical power load, while also tending to the charging of the rechargeable battery 730 as needed when excess power is available, and while also tending to the proper discharging of the rechargeable battery 730 as needed when additional power (beyond what can be provided at the maximum input current $I_{BP}$(max)) is needed to satisfy the thermostat electrical power load.

Operation of the powering circuitry 710 for the case in which the "C" wire is not present is now described. As used herein, "inactive power stealing" refers to the power stealing that is performed during periods in which there is no active call in place based on the lead from which power is being stolen. As used herein, "active power stealing" refers to the power stealing that is performed during periods in which there is an active call in place based on the lead from which power is being stolen.

During inactive power stealing, power is stolen from between, for example, the "Y" wire that appears at node 719 and the Rc lead that appears at node 717. There will be a 24 VAC HVAC transformer voltage present across nodes 719/717 when no cooling call is in place (i.e., when the Y-Rc FET switch is open). For one embodiment, the maximum current $I_{BP}$(max) is set to a relatively modest value, such as 20 mA, for the case of inactive power stealing. Assuming a voltage of about 4.4 volts at node 725, this corresponds to a maximum output power from the buck regulator system 724 of about 88 mW. This power level of 88 mW has been found to not accidentally trip the HVAC system into an "on" state due to the current following through the call relay coil. During this time period, the PAB regulator 728 operates to discharge the battery 730 during any periods of operation in which the instantaneous thermostat electrical power load rises above 88 mW, and to recharge the battery (if needed) when the instantaneous thermostat electrical power load drops below 88 mW. The thermostat 700 is configured such that the average power consumption is well below 88 mW, and indeed for some embodiments is even below 10 mW on a long-term time average.

Operation of the powering circuitry 710 for "active power stealing" is now described. During an active heating/cooling call, it is necessary for current to be flowing through the HVAC call relay coil sufficient to maintain the HVAC call relay in a "tripped" or ON state at all times during the active heating/cooling call. The secondary processor 708 is configured by virtue of circuitry denoted "PS MOD" to turn, for example, the Y-Rc FET switch OFF for small periods of time during the active cooling call, wherein the periods of time are small enough such that the cooling call relay does not "un-trip" into an OFF state, but wherein the periods of time are long enough to allow inrush of current into the bridge rectifier 720 to keep the bridge output capacitor 722 to a reasonably acceptable operating level. For one embodiment, this is achieved in a closed-loop fashion in which the secondary processor 708 monitors the voltage $V_{BR}$ at node 723 and actuates the signal Y-CTL as necessary to keep the bridge output capacitor 722 charged. According to one embodiment, it has been found advantageous to introduce a delay period, such as 60-90 seconds, following the instantiation of an active heating/cooling cycle before instantiating the active power stealing process. This delay period has been found useful in allowing many real-world HVAC systems to reach a kind of "quiescent" operating state in which they will be much less likely to accidentally un-trip away from the active cooling cycle due to active power stealing operation of the thermostat 102. According to another embodiment, it has been found further advantageous to introduce another delay period, such as 60-90 seconds, following the termination of an active cooling cycle before instantiating the inactive power stealing process. This delay period has likewise been found useful in allowing the various HVAC systems to reach a quiescent state in which accidental tripping back into an active cooling cycle is avoided.

Figure 8B:
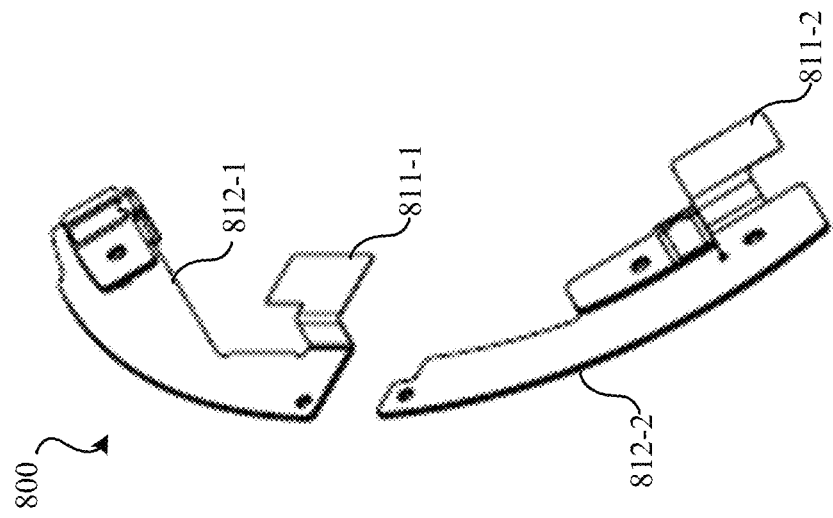
FIGS. 8A and 8B illustrate an angled view of a system of two antennas for use within a sensor device.
Figure 8A:
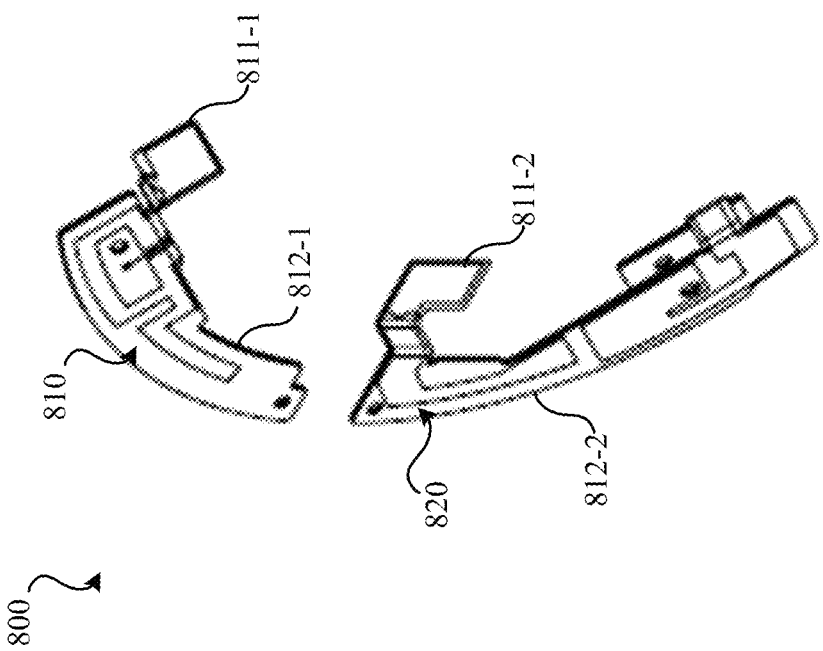

FIGS. 8A and 8B illustrate an angled view of system 800 of two antennas which may be installed with a sensor device, such as a thermostat. System 800 includes antenna 810 and antenna 820. FIG. 8B illustrates a reverse, angled view of system 800 from FIG. 8A. Antenna 810 is a loop antenna with a meander line tail, which may be optimized to transmit and/or receive data on the 2.4 GHz ISM band. Antenna 810 may be printed as traces onto a printed circuit board (PCB). Dimensions of antenna 810, which specify how antenna 810 is optimized for wireless communication on the above frequencies, are detailed in relation to FIG. 12. Antenna 810 can be used in conjunction with a wireless transceiver that communicates using 6LoWPAN under IEEE's 802.15.4 standard or may be used in conjunction with a wireless transceiver that uses another form of WPAN or WLAN.

Antenna 820 is also a form of loop antenna with a tail that may or may not, depending on embodiment, be meandered. Antenna 820 may be printed as traces onto a PCB, which may be the same or different PCB from antenna 810. Antenna 820 may be optimized to transmit and receive data on 2.4 GHz and 5 GHz bands. Dimensions of antenna 820, which specify how antenna 820 is optimized for wireless communication on the above frequencies, is detailed in relation to FIG. 13. Antenna 820 can be used in conjunction with a wireless transceiver that communicates using IEEE's 802.11 standard set (e.g., for communicating with a home's or other type of structure's WLAN) or may be used in conjunction with a wireless transceiver that uses another form of WPAN or WLAN.

Antenna 820 may be configured to communicate (transmit and/or receive), using different frequencies or frequency bands. To do so, antenna 820 may be dimensioned to have at least two distinct portions that allow for antenna 820 to have at least dual-band resonance. A tail portion of antenna 820 may be capacitively coupled with a main loop of antenna 820 to allow for effective communication in the 2.4 GHz range. The dimensions of antenna 820 may be altered to modify the resonance frequencies of antenna 820.

Antenna 810 and antenna 820 may each have an off-board RF ground connection 811-1 and 811-2 (collectively referred to as 811). Off-board RF ground connections 811 may allow for a metallic device, such as a metallic plane distinct from printed circuit boards (PCBs) 812-1 and 812-2 (collectively referred to as 812) on which antennas 810 and 820 are printed, to serve as the RF ground (e.g., RF ground plane). Each of antennas 810 and 820 may be printed onto a single or more than one (as illustrated) PCBs 812. Rather than having the RF ground for each loop antenna being a plane within each antenna's respective PCB (812-1 and 812-2), a separate device, such as a display's metallic backplane, may serve as the RF ground plane. Off-board RF ground connections 811-1 and 811-2 may electrically connect antennas 810 and 820, respectively, with an off-PCB metallic device to be used as the RF ground plane, such as metallic backplane 1030 of FIG. 10B. Use of such an off-PCB metallic component as the RF ground plane may have the benefit of providing a (significantly) larger ground plane than could be incorporated directly into the PCB of antenna 810 and/or antenna 820. Such a use of a larger RF ground plane can increase the sensitivity of antennas 810 and/or 820 for receiving and/or transmitting data.

Off-board RF ground connections 811 may be electrically connected with end of loop antennas 810 and 820. Off-board RF ground connection 811 may include traces or another form of electrical connector at least partially mounted on a flexible material. Off-board RF ground connection 811, as presented in FIGS. 8A and 8B, have two approximately 90 degree (e.g., 80, 85, 89 degree) bends in the flexible material, this allowing off-board RF ground connection 811 to connect antennas 810 and 820 with an RF ground plane that is substantially in a parallel plane with antennas 810 and 820.

Figure 9B:
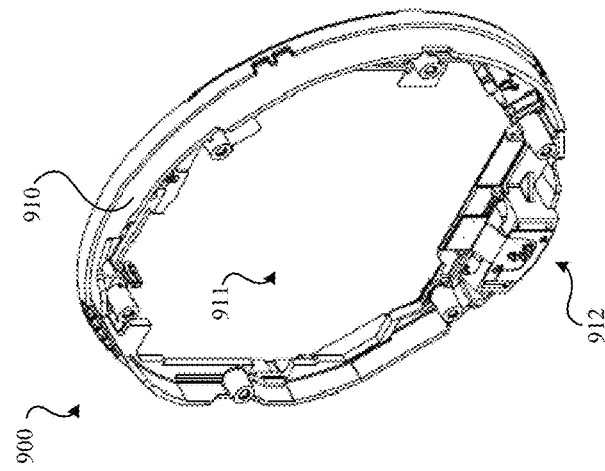
FIGS. 9A and 9B illustrate a mounting system for the two antennas.
Figure 9A:
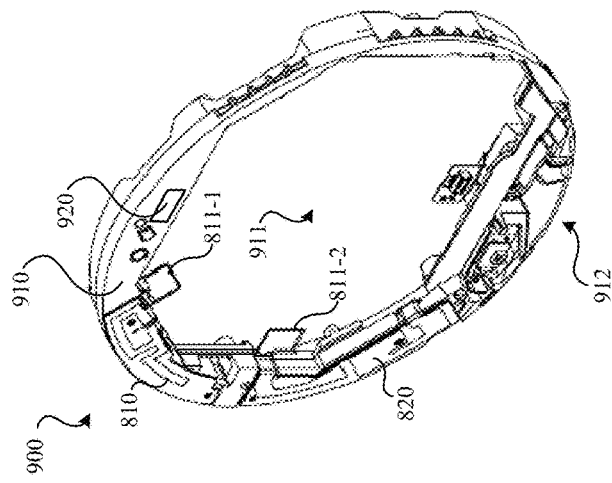

FIGS. 9A and 9B illustrate a mounting system 900 for the two antennas. FIG. 9B illustrates a reverse, angled view of mounting system 900 from FIG. 9A. For positioning and mounting of antennas 810 and 820, it may be desirable to have the antennas position such that few or no metallic components are present between the antennas and face of the sensor device. Further, a significant amount of room on the face of the sensor device may be reserved to permit visibility of the electronic display. Frame 910 may be a generally circular shape such as to fit within a metallic ring of a sensor device while allowing for a large electronic display position substantially within frame 910. Antenna 810 and antenna 820 may be mounted on a face of frame 910. Antennas 810 and 820 may be mounted on one side of frame 910. Space 911 may primarily be occupied by the electronic display, not pictured in FIGS. 9A and 9B, by antennas 810 and 820 being attached with frame 910; the electronic display may not be between the antennas and a face of the sensor device. When the electronic display is present within space 911, off-board RF ground connections 811 may electrically connect with a metallic backplane of the electronic display, thus using the metallic backplane as a substantially parallel ground plane to the antennas. Frame 910 may help hold such an electronic display in a plane substantially parallel with antennas 810 and 820.

Frame 910 may also serve additional purposes. For instance, frame 910 may serve to house and/or hold one or more PIR sensors, such as in region 912 of frame 910. In some embodiments, the PIR sensor is located 17 mm from the WLAN transceiver antenna. In other embodiments, the PIR sensor may be within 30, 25, 20, 15, 10 mm or some other distance of the WLAN transceiver antenna and may be as close as 1 mm. While many details of frame 910 are illustrated, it should be understood that other embodiments of frame 910 may contain additional or fewer features than those illustrated.

Additionally, in some embodiments, more than two antennas may be present and coupled with frame 910. For example, in FIG. 9A, a third antenna, antenna 920, is present. Such a third antenna may be present in any of the embodiments detailed herein. Antenna 920 may be used for communication using another protocol, such as Bluetooth® Low Energy (BLE). Generally, antenna 920 may be used for a low-power wireless communication protocol, such as to communicate with mobile devices. In some embodiments, antenna 920 may operate at 2.45 GHz, which may represent the same or a similar frequency band at which antennas 810 and 820 are also operated. While in some embodiments, antenna 920 may be a printed antenna that uses an off-board RF ground, antenna 920 may rather take a different form from antennas 810 and 820. For instance, antenna 920 may be a chip antenna (e.g., ceramic chip antenna) that is configured to be mounted to a PCB. In some instances, antenna 920 may be an inverted-F style antenna that can be soldered or otherwise mounted to a PCB. Antenna 920 may also be mounted in close proximity to an outer metallic ring 1410, such as within 10, 7, 5, 4, 3, or 2 mm and may be as close as 0.5 mm. Depending on the embodiment, antenna 920 may use a separate ground from antennas 810 and 820 or may also be connected with the off-board ground shared by antennas 810 and 820. In some embodiments, rather than using a packaged inverted-F style antenna, antenna 920 may be a loop style antenna with a tail (which may be meandered). It should further be understood that additional antennas may be attached to frame 910 if more than three antennas are desired to be included in the device.

Figure 10B:
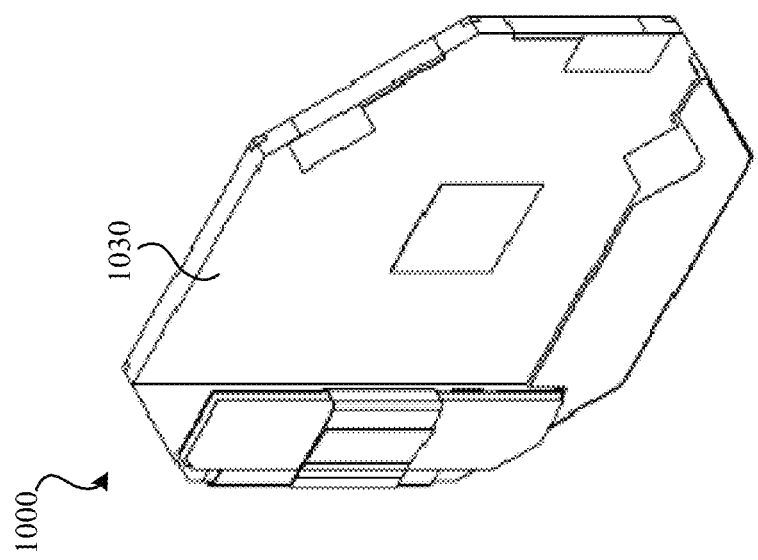
FIGS. 10A and 10B illustrate an electronic display that may be used in conjunction with the antenna system and/or frame of FIGS. 8A, 8B, 9A, and 9B.
Figure 10A:
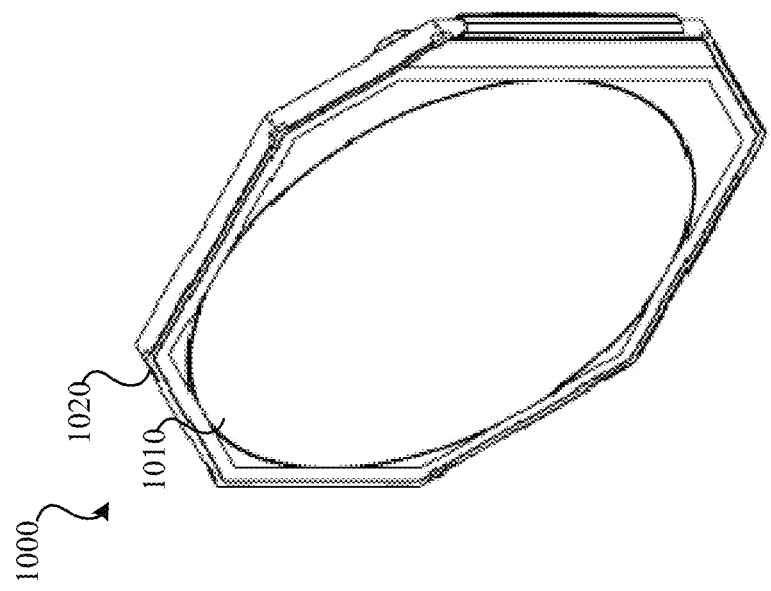

FIGS. 10A and 10B illustrate an electronic display module 1000 that may be used in conjunction with the antenna system and/or frame of FIGS. 8A, 8B, 9A, and 9B. FIG. 10B illustrates a reverse, angled view of electronic display module 1000 from FIG. 10A. Electronic display module 1000 may be a monochrome or multicolored electronic display. Such an electronic display may be dot-matrix style electronic display. Electronic display module 1000 may be an LCD, LED, or some other form of electronic display. Electronic display module 1000 may include display screen 1010, frame 1020, and metallic backplane 1030. Electronic display module 1000 may be communicatively coupled with one or more processors which serve to output information for display to electronic display module 1000. For instance, in the case of a thermostat, graphics and text, including temperatures, may be output for display such as a setpoint temperature, the current temperature, a time to temperature, configuration settings, etc.

Frame 1020 may serve to at least partially house display screen 1010 and may serve to help couple electronic display module 1000 with frame 910. That is, frame 910 may at least partially surround electronic display module 1000, making contact with frame 1020. On the rear of electronic display module 1000, metallic backplane 1030 may be present. Metallic backplane 1030 may be electrically connected with antennas 810 and 820 via off-board RF ground connections 811. As such, metallic backplane 1030 may serve a dual purpose: providing RF shielding for electronic display module 1000 and also serving as the RF ground plane for antenna 810, antenna 820, or both.

In some embodiments, display screen 1010 may be circular and the diameter of display screen 1010 may be between 50 and 60 mm, such as 53.28 mm. Frame 1020 may be between 60 and 70 mm in height, such as 61.38 mm. Frame 1020 may be between 55 and 65 mm in width, such as 58.06 mm. It should be understood that these dimensions are merely exemplary; in other embodiments such dimensions may be varied depending on the desired dimensions of electronic display module 1000.

FIGS. 11A and 11B illustrate views of system 1100 of two antennas which may be installed with a sensor device, such as a thermostat. System 1100 includes antenna 810 and antenna 820. Accordingly, system 1100 represents an alternative view of system 800 of FIGS. 8A and 8B. FIG. 11B illustrates a reverse view of system 1100 from FIG. 11A. In some embodiments, the antennas are located 1.2 mm from metallic ring 1410. In other embodiments, the antennas may be within 10, 7, 5, 11, 3, 2, or even 1 mm of metallic ring 1410.

Antenna 810, a loop antenna formed by traces on PCB 812-1, has several components including: RF feed connector 1111, main loop 1112, RF ground connection 1113, and tail 1114, which, in some embodiments, may be meandered. RF feed connector 1111 may serve to connect main loop 1112 with a source of RF. RF feed connector 1111 may also serve to receive signals from antenna 810. Therefore, RF feed connector 1111 may be connected with a transceiver capable of transmitting and receiving RF. Similar to off-board RF ground connection 811-1, RF feed connector 1111 may include a flexible portion used to connect to a wireless transceiver, which may be located on a separate PCB than PCB 812-1. For instance, in some embodiments, on PCB 812-1, only antenna 810 is present.

Figure 12:
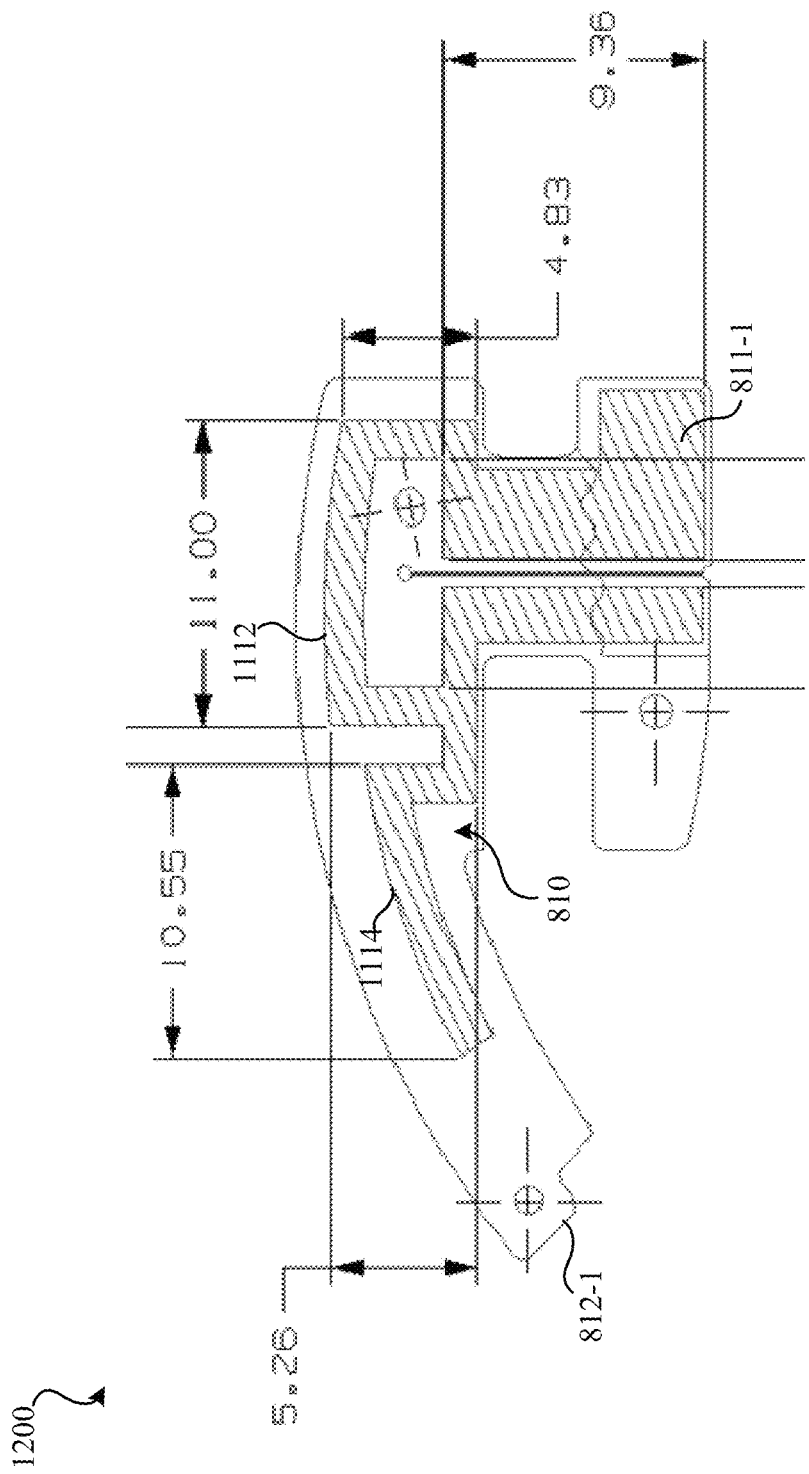
FIG. 12 illustrates a dimensioned view of a first antenna for use within a sensor device.

Main loop 1112 and tail 1114 may be tuned to a particular frequency band, such as via the dimensions of FIG. 12, such that the frequency at which antenna 810 is used to receive and/or transmit data is at or near antenna 810's resonance frequency. RF ground connection 1113 may serve to connect main loop 1112 with off-board RF ground connection 811-1.

Antenna 820, a loop antenna formed by traces on PCB 812-2, has several components including: RF feed connector 1121, main loop 1122, capacitively-coupled tail 1123 (which may or may not be meandered), and RF ground connection 1124. RF feed connector 1121 may serve to connect main loop 1122 with a source of RF. RF feed connector 1121 may also serve to receive signals from antenna 820. Therefore, RF feed connector 1121 may be connected with a transceiver capable of transmitting and receiving RF. Similar to off-board RF ground connection 811-2, RF feed connector 1121 may include a flexible portion used to connect to a wireless transceiver, which may be located on a separate PCB than PCB 812-2. For instance, in some embodiments, on PCB 812-2, only antenna 820 is present.

Figure 13:
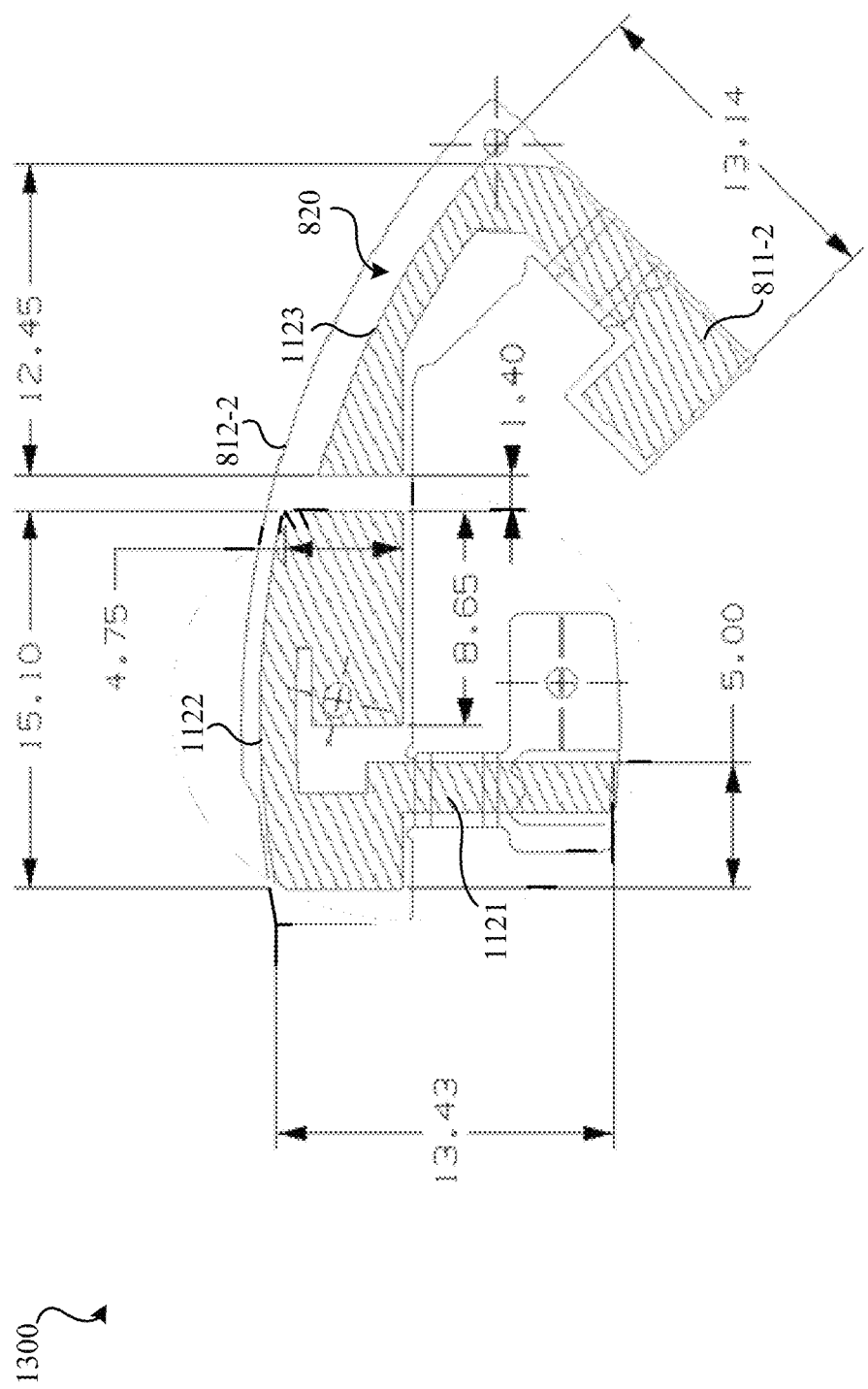
FIG. 13 illustrates a dimensioned view of a second antenna for use within a sensor device.

Main loop 1122 and capacitively-coupled tail 1123 may be tuned to a particular frequency band, such as via the dimensions of FIG. 13, such that the frequency at which antenna 820 is used to receive and/or transmit data is at or near antenna 820's resonant frequency. By using capacitively-coupled tail 1123, which is distinct from main loop 1122, antenna 820 may effectively be tuned to multiple frequencies. RF ground connection 1124 may serve to connect capacitively-coupled tail 1123 with off-board RF ground connection 811-2.

FIG. 12 illustrates a dimensioned view 1200 of antenna 810 on PCB 812-1. The dimensions illustrated in FIG. 12, in millimeters, are intended to be exemplary. For instance, such dimensions may be adjusted based on the desired resonance frequency of antenna 810. Since antenna 810 may be used for communication using IEEE's 802.15.4 standard, antenna 810 may be optimized, via the illustrated dimensions, for transmitting and/or receiving data in the 2.45 GHz frequency band. To adjust antenna 810 for different frequency bands, for example, the height of main loop 1112 may be adjusted between 3 and 9 mm, the width of main loop 1112 may be adjusted between 9 and 15 mm (and may be meandered), and the length of tail 1114 may be adjusted between 9 and 13 mm. Other dimensions, such as the distance from the inside edge of main loop 1112 to the edge of the off-board RF ground connection 811-1 may also be varied.

FIG. 13 illustrates a dimensioned view 1300 of antenna 820 on PCB 812-2. The dimensions illustrated in FIG. 13, in millimeters, are intended to be exemplary. For instance, such dimensions may be adjusted based on the desired resonance frequencies of antenna 820. While antenna 810 targets a single frequency band for resonance and antenna 820 has dual-band resonance, it should be understood that in other embodiments both antennas may have single or dual-band resonance. Since antenna 820 may be used for communication using IEEE's 802.11 standard set, antenna 820 may be optimized, via the illustrated dimensions, for transmitting and/or receiving data in the following frequency bands: 5 GHz and 2.4 GHz. Specifically, these frequency bands may be useful in communicating using IEEE's 802.11(a), (b), (g), (n) and (ac) standard set. Antenna 820 may generally be adopted for other forms of WLAN and, more generally, wireless communication. To adjust antenna 820 for different frequency bands, for example, the width of main loop 1122 may be adjusted between 11 and 19 mm, the width of capacitively-coupled tail 1123 may be adjusted between 9 and 16 mm, and other dimensions of antenna 820 may also be varied. In some embodiments, tail 1123 is meandered.

Figure 14:
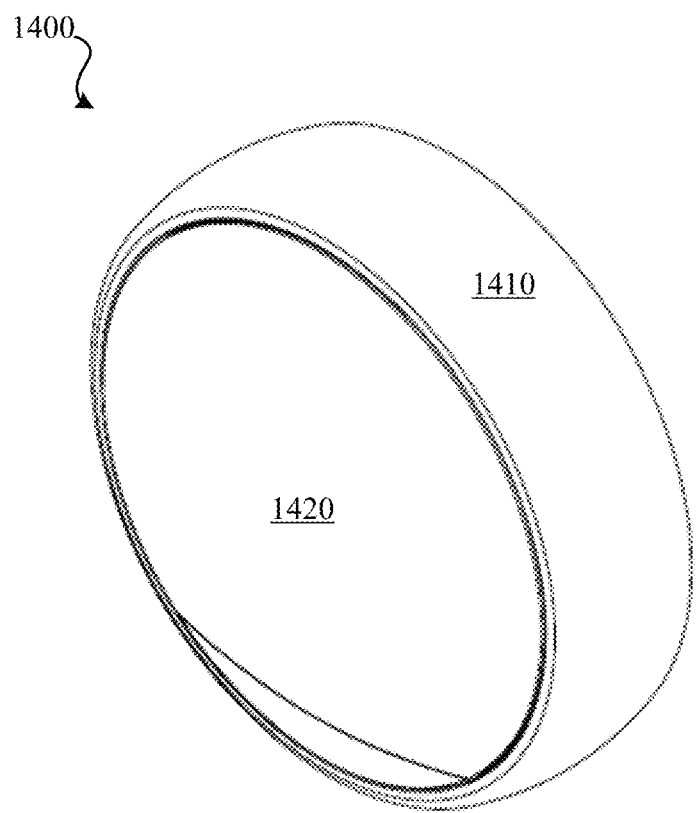
FIG. 14 illustrates an embodiment of an exterior of a sensor device.

FIG. 14 illustrates an embodiment of an exterior of sensor device 1400. Sensor device 1400 is illustrated as assembled, comprising metallic ring 1410 and cover 1420 through which display screen 1010 of FIG. 10A is visible. Metallic ring 1410 can be rotated counterclockwise or clockwise by a user. In some embodiments, metallic ring 1410 can be pressed by a user (providing user input) such that it mechanically moves a distance along the center axis around which metallic ring 1410 rotates. Present within sensor device 1400 are antennas 810 and 820. Antennas 810 and 820 may be less than 5 mm, 10 mm, or, in some embodiments 20 mm from metallic ring 1410 and may be up to as close as 0.5 mm from the metallic ring.

The use of one or more of antennas 810 and 820 to transmit data in proximity with one or more PIR sensors of the sensor device may adversely affect measurements made by the one or more PIR sensors. For instance, when a data transmission is initiated or ended by a wireless transmitter, such as a wireless transceiver (e.g., broadcasting at 2.4 or 5 GHz according to IEEE's 802.11(g) or (n) standard set) using antenna 820, a PIR sensor proximate to antenna 820 (e.g., within 8, 5, 3, or 2 cm, up to as close as 0.5 mm) may have its measurements altered. Both the start and end of a data transmission may adversely impact PIR measurements;

however, the data stream made between the start and end of the wireless transmission may have no effect or a significantly smaller effect on PIR performance.

Figure 15:
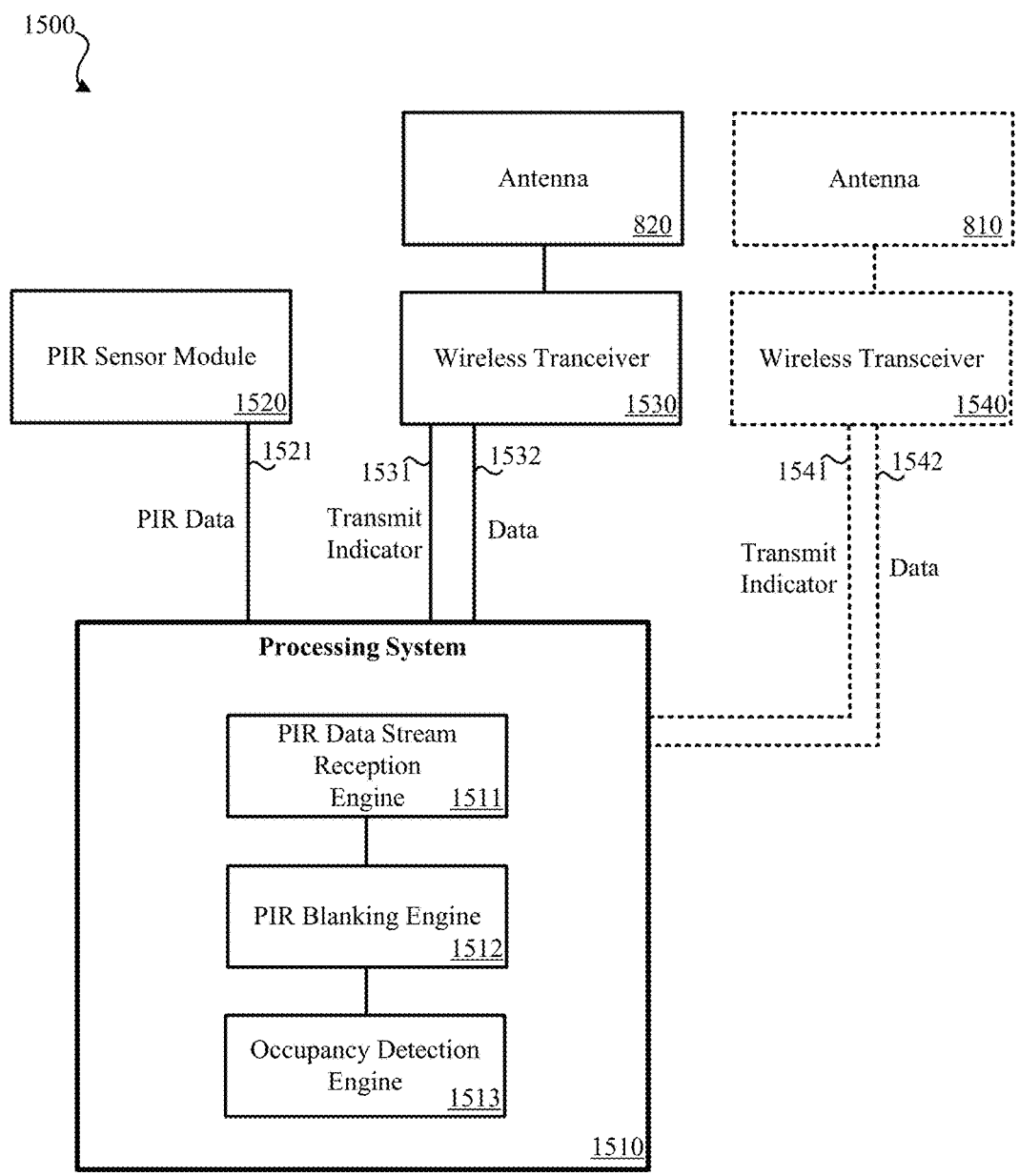
FIG. 15 illustrates an embodiment of a system for handling PIR measurements to counteract wireless transmitter interference.

FIG. 15 illustrates an embodiment of a system 1500 for handling PIR measurements to counteract wireless transmitter interference. System 1500 may include: processing system 1510, PIR sensor module 1520, antenna 820, and wireless transceiver 1530. In some embodiments, multiple antennas and wireless transceivers may be present, such as antenna 810 and wireless transceiver 1540. Alternatively, in other embodiments, only antenna 810 and wireless transceiver 1540 may be present in communication with processing system 1510.

PIR sensor module 1520 may include one or more PIR sensors that sense infrared in the ambient environment of the sensor device. PIR sensor module 1520 may output PIR data via data interface 1521 to processing system 1510. Also in communication with processing system 1510 may be wireless transceiver 1530 that sends and receives wireless data via antenna 820 (wireless transceiver 1530 may be a transceiver configured to use IEEE's 802.11 protocol operating at the 2.4 GHz or 5 GHz frequency bands or some other wireless communication protocol). Wireless transceiver 1530 may use data interface 1532 to exchange data with processing system 1510. Wireless transceiver 1530 may use a separate communication interface to alert processing system 1510 when wireless transceiver 1530 is transmitting data via antenna 820. Transmit indicator 1531 may be high when wireless transceiver 1530 is transmitting data; transmit indicator 1531 may be low when wireless transceiver 1530 is not transmitting data. Therefore, when a transition from low to high and high to low is present on transmit indicator 1531, processing system 1510 can determine that a data transmission has either begun or ended. While in some embodiments wireless transceiver 1530 may output a higher low indication on transmit indicator 1531 to indicate that a wireless transmission is in progress, in other embodiments, wireless transceiver 1530 may alert processing system 1510 in some other way that a wireless data transmission is in progress.

Similar to antenna 820 and wireless transceiver 1530, antenna 810 and wireless transceiver 1540 may affect PIR measurements. If PIR measurements are affected by wireless transceiver 1540, a transmit indicator 1541, similar to transmit indicator 1531, may be present for wireless transceiver 1540 to alert processing system 1510 when a data transmission is in progress using antenna 810. In some embodiments, while wireless transceiver 1540 and antenna 810 may be used to exchange data with one or more other computerized devices, processing system 1510 may not need to be aware of such transmissions because of limited or no effect of the wireless transmissions on the measurements being made by PIR sensor module 1520. Data interface 1542 may be used to exchange data between wireless transceiver 1540 and processing system 1510.

Processing system 1510 may include several components that alter how PIR data is handled based on wireless transmissions being made by wireless transceiver 1530 and/or wireless transceiver 1540. Processing system 1510 may include one or more processors, such as controllers, that receive and process PIR sensor data. The handling of such PIR sensor data may be modified based on whether transmit indicator 1531 and/or transmit indicator 1541 indicate that a wireless transmission has begun or ended.

PIR data stream reception engine 1511 may receive and, possibly, offer PIR data received from PIR sensor module 1520. This received and, possibly, buffered data from PIR sensor module 1520 may represent raw PIR data. Thus, when a wireless transmission begins or ends, such as by wireless transceiver 1530, the received PIR data may be affected by such a wireless transmission beginning or ending.

PIR blanking engine 1512 may access or otherwise receive data received and, possibly, buffered by PIR data stream reception engine 1511. PIR blanking engine 1512 may monitor transmit indicator 1531 and/or transmit indicator 1541 such that, when wireless transceiver 1530 and/or wireless transceiver 1540 have begun or ended a data transmission, PIR blanking engine 1512 can blank received PIR data. The duration of time for which PIR data is blanked at the beginning and/or end of a data transmission may be predefined and stored by processing system 1510. The duration may vary based on which wireless transceiver is transmitting and/or whether the wireless transmission is beginning or ending.

Once the PIR data stream has been modified by PIR blanking engine 1512, the modified PIR data stream may be output to another component of processing system 1510 for further filtering and/or analysis. In some embodiments, one or more other filtering techniques are applied to the modified PIR data stream. Occupancy detection engine 1513 may use PIR data from PIR blanking engine 1512 to determine whether a vicinity of the sensor device is occupied by one or more persons. For instance, this may involve occupancy detection engine 1513 comparing the modified PIR data stream to a threshold. If the threshold is exceeded by the modified PIR data stream, it may be determined that an infrared emitting object, such as a person, is present in the vicinity of the sensor device.

In FIG. 15, embodiments are detailed that use one antenna and one transceiver, and two antennas and two transceivers. Either of these embodiments may use the antenna and sensor device arrangements of FIGS. 1-14. It should understood that system 1500 may be adapted for embodiments in which three or more wireless transceivers provide indication of data transmissions to processing system 1510 for use in blanking data from PIR sensor module 1520.

Figure 16:
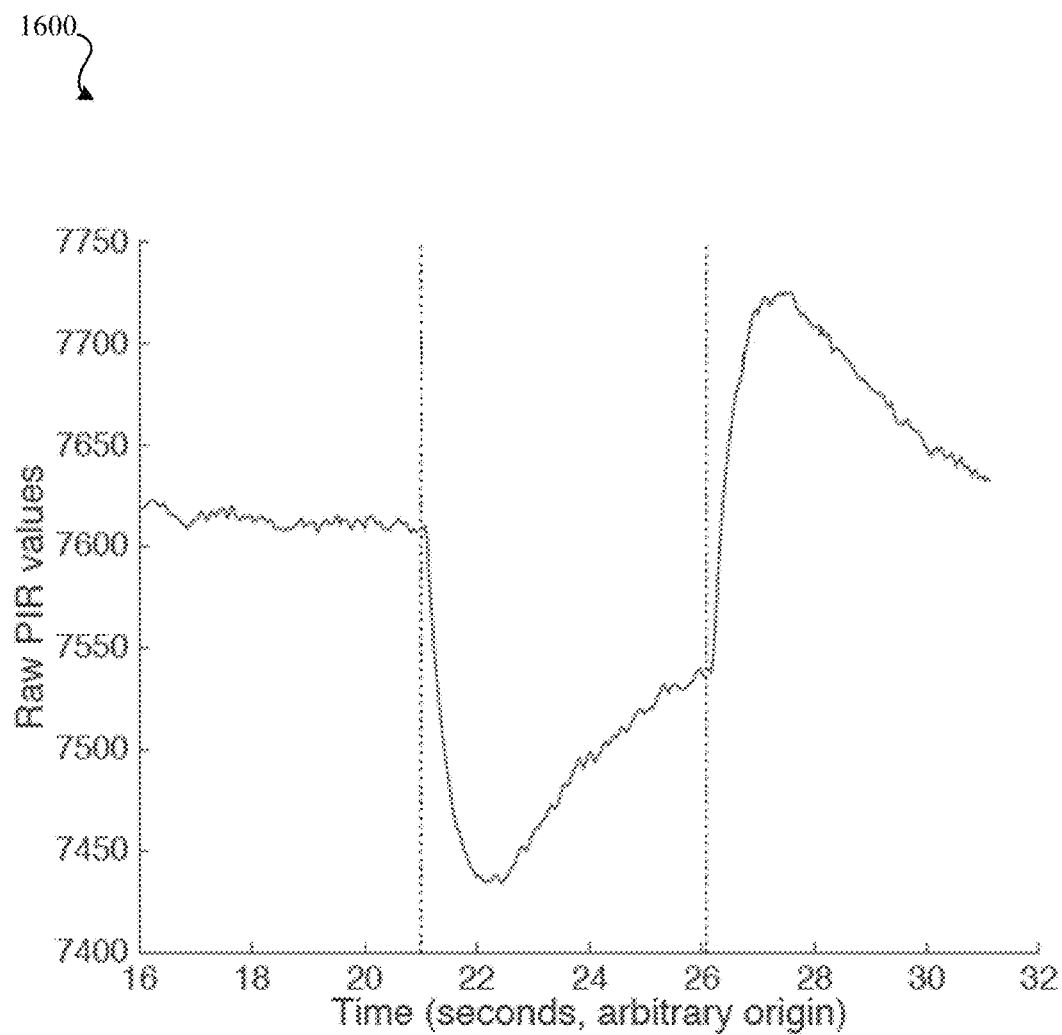
FIG. 16 illustrates a graph of raw PIR measurement values against time when a WLAN transmission begins and ends.

FIG. 16 illustrates a graph of raw PIR measurement values against time when a WLAN transmission begins and ends. In graph 1600 of FIG. 16, a data transmission begins at 21.0 seconds and ends at 26.1 seconds. In graph 1600, no filtering is performed on the PIR data based on the start and end of the data transmission. Graph 1600 shows a drop of almost 200 (raw PIR value measurement) when the data transmission begins and a spike of roughly 180 when the data transmission ends. If occupancy is determined by the sensor device by comparing PIR measurements to a threshold, either or both of the spikes following a data transmission starting and ending could result in an incorrect determination. While FIG. 16 is focused on a data transmission by a WLAN transceiver, similar effects on PIR measurements may be made by other transceivers that operate in proximity to the PIR sensor module, operate at similar frequencies, operate at similar power levels, and/or operate at different frequencies and/or power levels.

Figure 17:
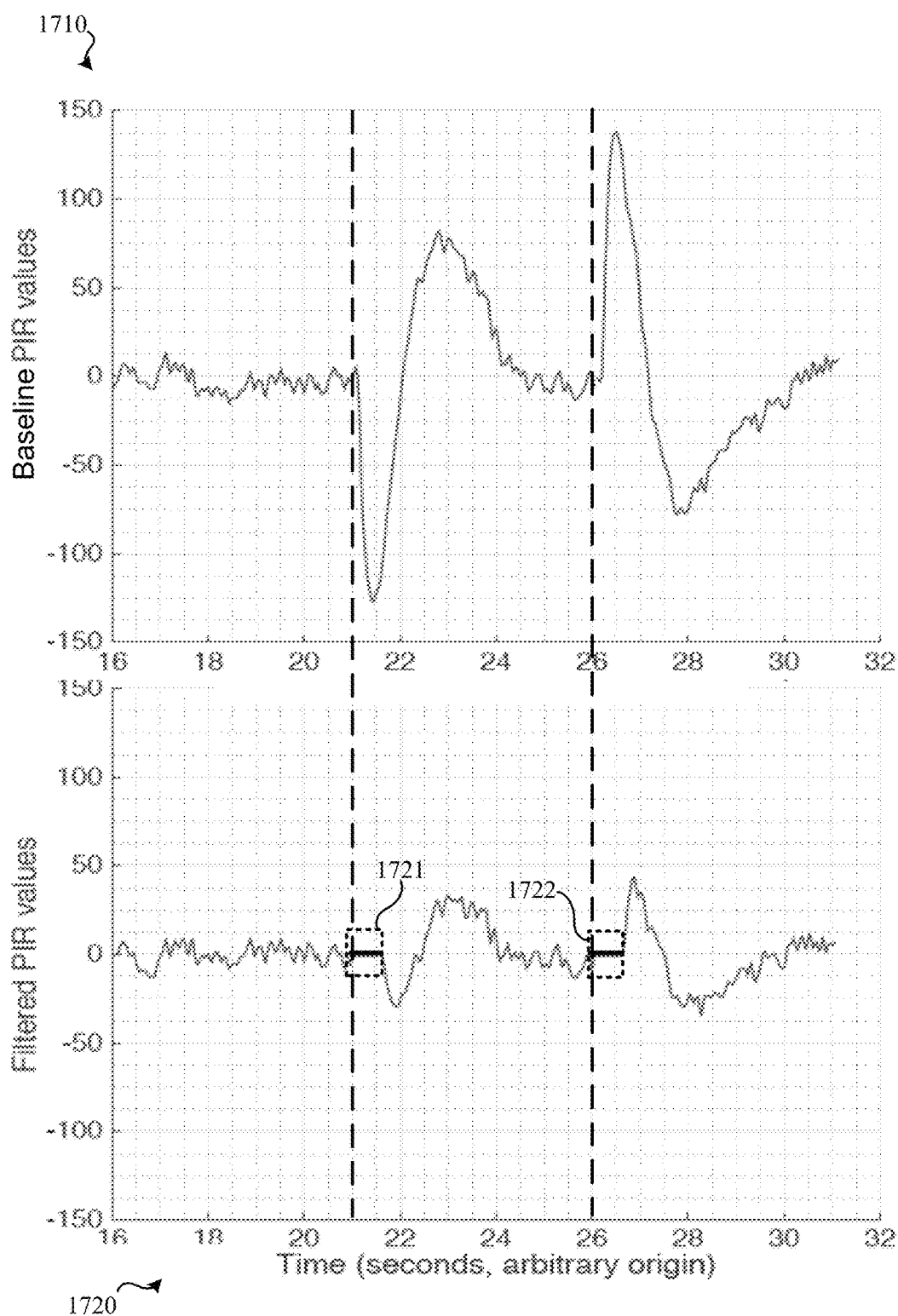
FIG. 17 illustrates two graphs of PIR measurement values against time when a WLAN transmission begins and ends.

FIG. 17 illustrates two graphs of PIR measurement values against time when a WLAN transmission begins and ends. In graph 1710, The baseline PIR values are graphed. These baseline filtered PIR values refers to PIR values that have had at least some level of filtering performed on them. While FIG. 16 illustrates raw PIR output data, FIG. 17 represents a baseline filtered output to which blanking is then applied (resulting in graph 1720). As such, it should be understood that some filtering may be applied to raw PIR data before blanking is performed.

In graph 1720, filtered PIR values are graphed. These filtered PIR values represent a duration of time being blanked for a duration of time following a start of a data transmission at 21 seconds and an end of the data transmission at 26.1 seconds. In graph 1720, the duration of time for blanking at the beginning and end of the data transmission used for blanking is the same; however, in other embodiments, different durations of time may be used for blanking at the beginning and end of data transmission. Additionally or alternatively, the duration may vary based on which transceiver is transmitting.

In graph 1720, the duration of blanking is 600 milliseconds. This blanking causes the output value from the PIR sensor module to be ignored and a value of 0 to be used in place of the PIR sensor module's output. In graph 1720, blanking occurs at blanked portion 1721 and blanked portion 1722. This blanking greatly reduces the transients due to the start and finish of a data transmission. The filtered PIR value data stream can then be used for determining occupancy in the vicinity of the PIR sensor. Therefore, determining the presence of an object in the vicinity of the PIR sensor (e.g., occupancy of a person) involves excluding from consideration PIR values received from the PIR sensor module during the blanked portion of the PIR data stream. Rather, a value of zero or some other value may be substituted into the PIR data stream that is evaluated for the presence of the object. It should be understood that in other embodiments, varying blanking durations may be used, such as any value between 20 and 1000 milliseconds, or even possibly outside of this range.

Figure 18:
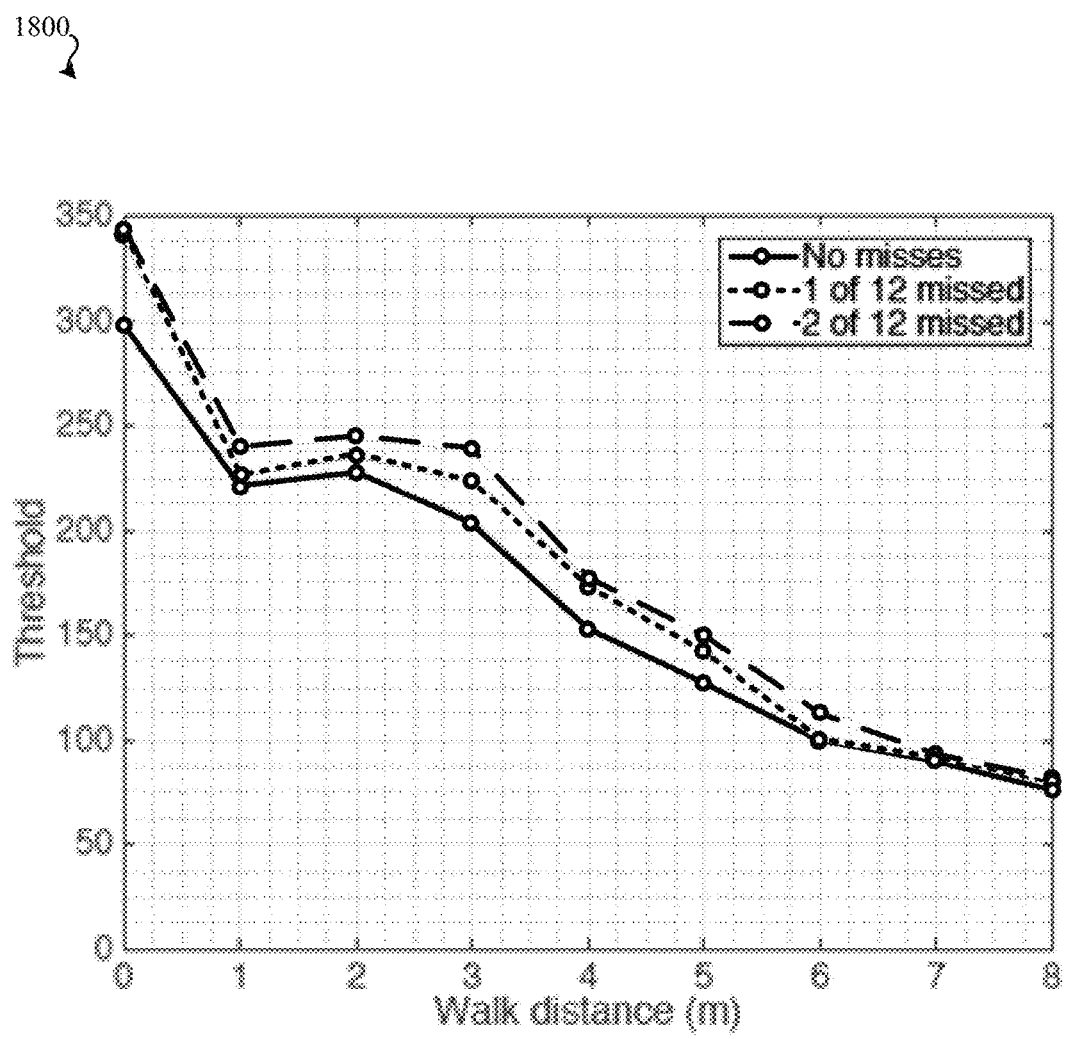
FIG. 18 illustrates a graph of PIR value thresholds that can be used to evaluate filtered PIR measurements to determine if an object is present at various distances.

FIG. 18 illustrates a graph 1800 of PIR value thresholds that can be used to evaluate against filtered PIR measurements to determine if a person walking by the sensor device is present at various distances. As seen in graph 1800, in order to sense a person at a greater distance, a lower PIR value threshold is used. The threshold can be increased if a number of missed detections of the person can be tolerated for the use of the sensor device. By eliminating or decreasing the effect of transients caused by starting and/or ending a wireless data transmission on the PIR data stream, the threshold can be decreased, thus increasing the ability to detect a person at a greater distance.

The antennas and systems of FIGS. 1A-15 can be used to perform various methods. The methods of FIGS. 12 and 20 can be performed using the sensor devices (e.g., thermostats), antennas, transceivers, and systems of FIGS. 1A-15. System 800 represents a system that can perform the steps of method 1900.

Figure 19:
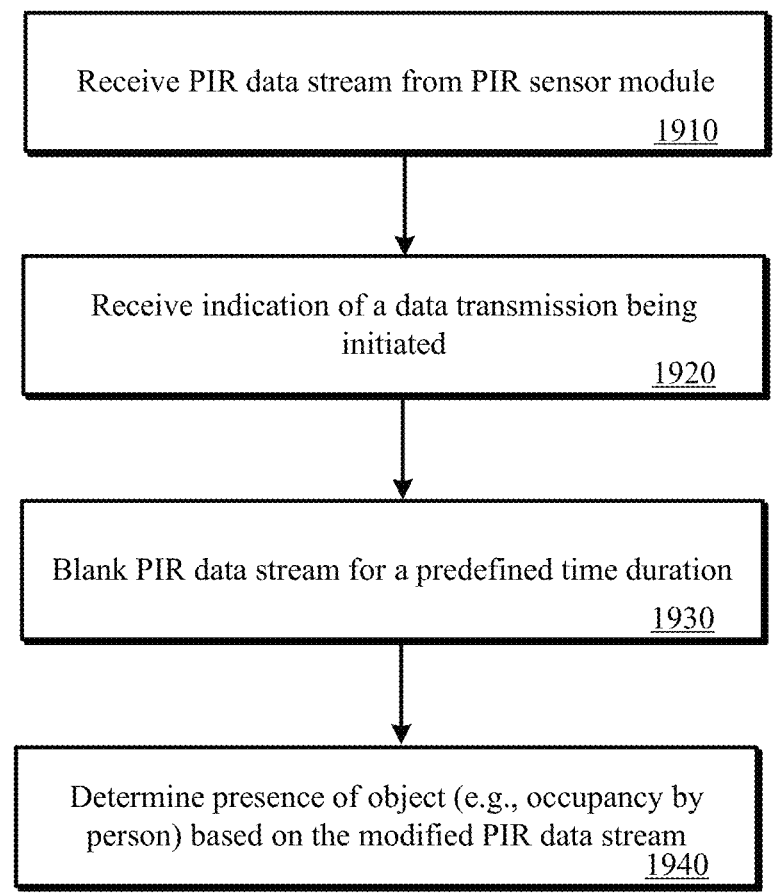
FIG. 19 illustrates an embodiment of a method for detecting an object using a PIR sensor module.

FIG. 19 illustrates an embodiment of a method 1900 for detecting an object using a PIR sensor module. At block 1910, a raw PIR data stream may be received from a PIR sensor module. This PIR data stream may have various transients present due to the beginning and/or ending of data transmissions performed by one or more wireless transceivers. Therefore, the raw PIR data stream is received by a processing device (e.g., a controller) or system (e.g., multiple processors or controllers) without any filtering having been performed.

At block 1920, the processing device or system may receive an indication of the data transmission being initiated. For instance, a rising or falling edge on a communication line between a wireless transceiver and the processing system may indicate the start of a wireless transmission via an antenna by the wireless transceiver. At block 1930, in response to receiving the indication of the data transmission being initiated, the processing system or device may blank the PIR data stream for a predefined time duration. Such blanking may involve ignoring PIR measurement values received during the predefined time duration and replacing them with another value, such as zero.

At block 1940, the presence of an object, such as whether a location within a structure where the sensor device is installed is occupied by a person, is determined based on an analysis of the modified PIR data stream. This analysis may involve assessing a portion of the PIR data stream before and after the portion of the PIR data stream to be blanked (that is, rather than blanking the PIR data stream by modifying the PIR data stream values, the "blanked" portion of the data stream can simply be ignored from analysis). In some embodiments, the PIR data stream is analyzed including the portion of the modified PIR data stream that was blanked to a particular value, such as zero. It should be understood that in addition to blanking a portion the PIR data stream, other filtering may be performed. Such other filtering may condition the modified PIR data stream to increase the ability of the processing system to accurately determine occupancy in the vicinity of the sensor device.

Figure 20:
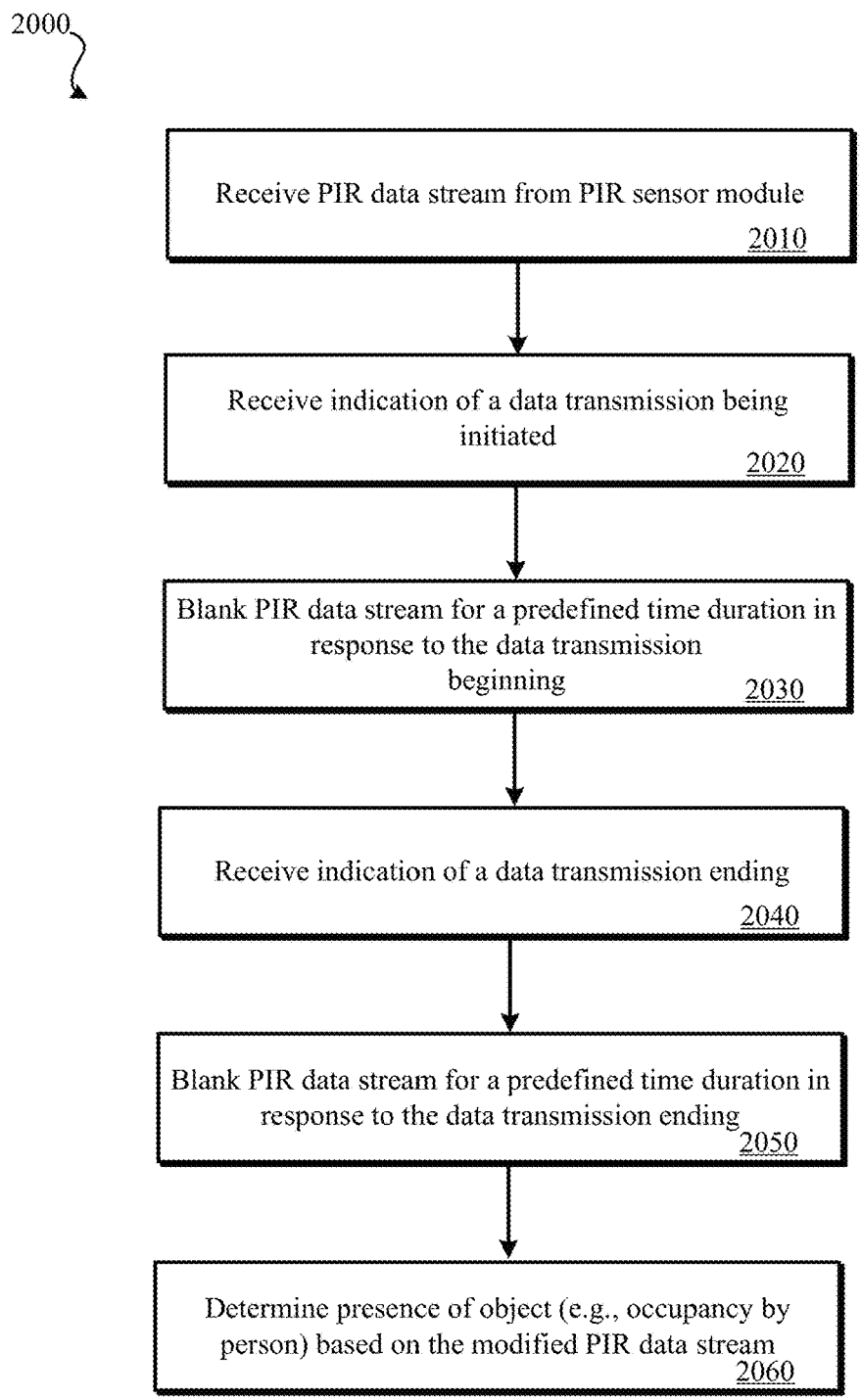
FIG. 20 illustrates another embodiment of a method for detecting an object using a PIR sensor module.

FIG. 20 illustrates an embodiment of a method 2000 for detecting an object using a PIR sensor module. While method 1900 referred to only a portion of a PIR data stream being blanked that corresponds to the initiation of a data transmission, method 2000 refers to two portions of the PIR data stream being blanked: a portion that corresponds to the beginning of the data transmission and a portion of the PIR data stream that corresponds to the end of the data transmission. It should be understood that method 2000 can be modified to only blank a portion of the PIR data stream that corresponds to the end of a data transmission.

At block 2010, a raw PIR data stream may be received from a PIR sensor module. This PIR data stream may have various transients present due to the beginning and/or ending of data transmissions performed by one or more wireless transceivers. Therefore, the raw PIR data stream is received by a processing device (e.g., a controller) or system (e.g., multiple processors or controllers) without any filtering having been performed (or only minimal filtering performed).

At block 2020, the processing device or system may receive an indication of the data transmission being initiated. For instance, a rising or falling edge on a communication line between a wireless transceiver and the processing system may indicate the start of a wireless transmission via an antenna by the wireless transceiver. At block 2030, in response to receiving the indication of the data transmission being initiated, the processing system or device may blank the PIR data stream for a predefined time duration. Such blanking may involve ignoring PIR measurement values received during the predefined time duration or replacing them with another value, such as zero, such that a continuous, modified PIR data stream is maintained.

At block 2040, the processing device or system may receive an indication of the data transmission being ended. For instance, a falling or rising edge (e.g., the opposite of block 2020) on the communication line between the wireless transceiver and the processing system may indicate the end of a wireless transmission via an antenna by the wireless transceiver. At block 2050, in response to receiving the indication of the data transmission being ended, the processing system or device may blank the PIR data stream for a predefined time duration. This duration may be the same as at block 2030 or may vary in duration. For instance, the processing system may store or access indications of how long each blanking duration is to be used. Such blanking may involve ignoring PIR measurement values received during the predefined time duration or replace such measurements with another value, such as zero, such that a continuous, modified PIR data stream is maintained.

At block 2060, the presence of an object, such as whether a location within a structure where the sensor device is installed is occupied by a person, is determined based on an analysis of the modified PIR data stream. This analysis may involve assessing a portion of the PIR data stream before and after the portions of the PIR data stream blanked (that is, rather than blanking the PIR data stream by modifying the PIR data stream values, the "blanked" portions of the data stream can simply be omitted from analysis). In some embodiments, the PIR data stream is analyzed including the portions of the modified PIR data stream that were blanked to a particular value, such as zero. It should be understood that, in addition to blanking the portions of the PIR data stream, other filtering may be performed. Such other filtering may condition the modified PIR data stream to increase the ability of the processing system to accurately determine occupancy in the vicinity of the sensor device.

Figure 21:
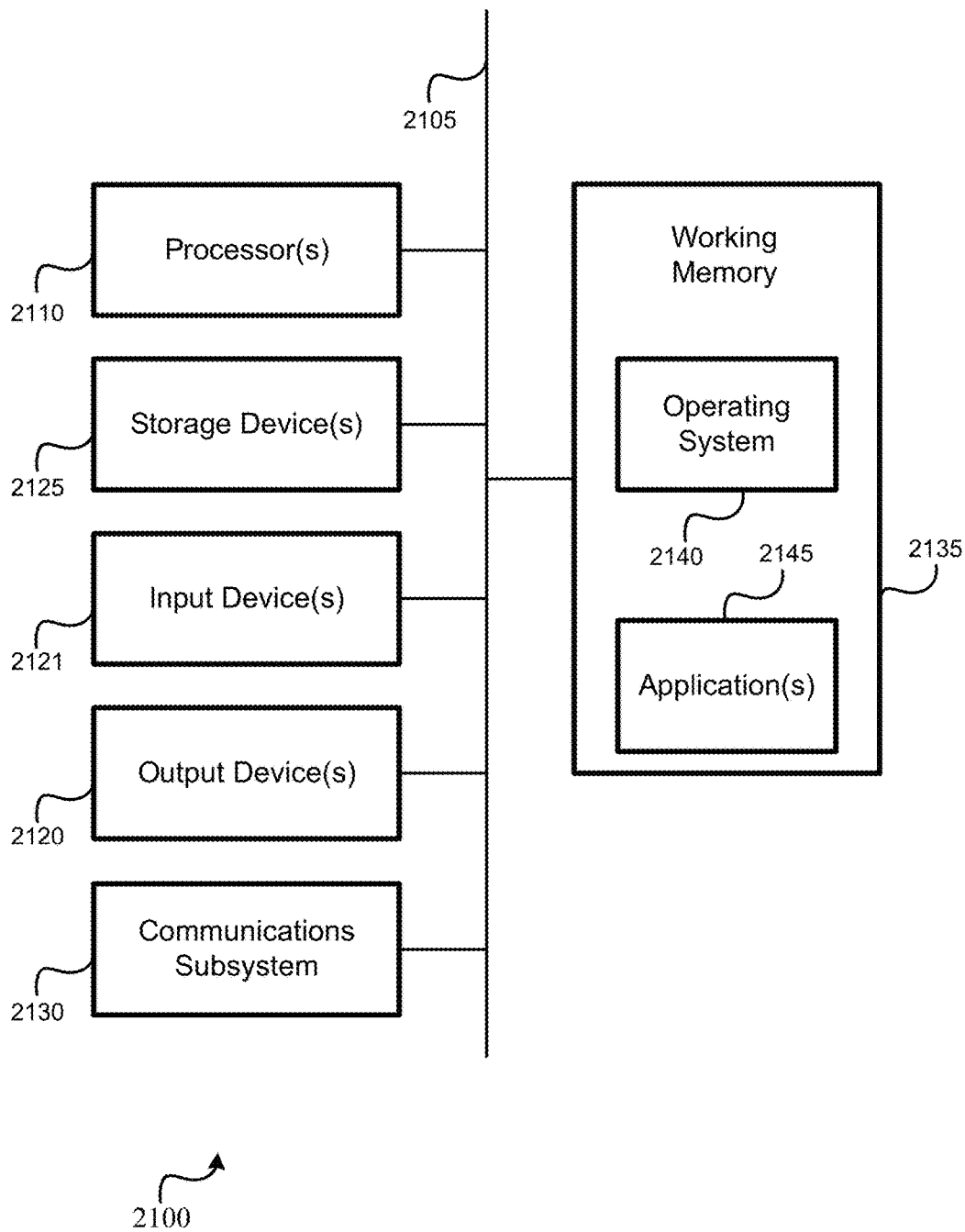
FIG. 21 illustrates an embodiment of a computer system that may be incorporated as part of the devices, such as thermostats, detailed herein.

A computer system as illustrated in FIG. 21 may be incorporated as part of the previously described sensor device, such as a thermostat. FIG. 21 provides a schematic illustration of one embodiment of a computer system 2100 that can perform various steps of the methods provided by various embodiments. It should be noted that FIG. 21 is meant only to provide a generalized illustration of various components, any or all of which may be utilized as appropriate. FIG. 21, therefore, broadly illustrates how individual system elements may be implemented in a relatively separated or relatively more integrated manner.

The computer system 2100 is shown comprising hardware elements that can be electrically coupled via a bus 2105 (or may otherwise be in communication, as appropriate). The hardware elements may include one or more processors 2110, including without limitation one or more general-purpose processors and/or one or more special-purpose processors (such as digital signal processing chips, graphics acceleration processors, video decoders, and/or the like); one or more input devices 2115, which can include without limitation a mouse, a keyboard, remote control, and/or the like; and one or more output devices 2120, which can include without limitation a display device, a printer, and/or the like.

The computer system 2100 may further include (and/or be in communication with) one or more non-transitory storage devices 2125, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 2100 might also include a communications subsystem 2130, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 2130 may permit data to be exchanged with a network (such as the network described below, to name one example), other computer systems, and/or any other devices described herein. In many embodiments, the computer system 2100 will further comprise a working memory 2135, which can include a RAM or ROM device, as described above.

The computer system 2100 also can comprise software elements, shown as being currently located within the working memory 2135, including an operating system 2140, device drivers, executable libraries, and/or other code, such as one or more application programs 2145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 2125 described above. In some cases, the storage medium might be incorporated within a computer system, such as computer system 2100. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 2100 and/or might take the form of source and/or installable code, which, upon compilation and/or installation on the computer system 2100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 2100) to perform methods in accordance with various embodiments of the invention. According to a set of embodiments, some or all of the procedures of such methods are performed by the computer system 2100 in response to processor 2110 executing one or more sequences of one or more instructions (which might be incorporated into the operating system 2140 and/or other code, such as an application program 2145) contained in the working memory 2135. Such instructions may be read into the working memory 2135 from another computer-readable medium, such as one or more of the non-transitory storage device(s) 2125. Merely by way of example, execution of the sequences of instructions contained in the working memory 2135 might cause the processor(s) 2110 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 2100, various computer-readable media might be involved in providing instructions/code to processor(s) 2110 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 2125. Volatile media include, without limitation, dynamic memory, such as the working memory 2135.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 2110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 2100.

The communications subsystem 2130 (and/or components thereof) generally will receive signals, and the bus 2105 then might carry the signals (and/or the data, instructions, etc. carried by the signals) to the working memory 2135, from which the processor(s) 2110 retrieves and executes the instructions. The instructions received by the working memory 2135 may optionally be stored on a non-transitory storage device 2125 either before or after execution by the processor(s) 2110.

It should further be understood that the components of computer system 2100 can be distributed across a network. For example, some processing may be performed in one location using a first processor while other processing may be performed by another processor remote from the first processor. Other components of computer system 2100 may be similarly distributed. As such, computer system 2100 may be interpreted as a distributed computing system that performs processing in multiple locations. In some instances, computer system 2100 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

It is to be appreciated that while blanking is described in one or more of the above-referenced embodiments as including modifying a subject portion data stream to zeroes (or other value representative of a null value or nullity) and/or as disregarding or omitting the subject portion from a computation or analysis, the scope of the present disclosure is by no means so limiting. By way of example, blanking may include identifying a subject portion of a data stream that may be zeroed, nullified, and/or disregarded in one or more processing steps, regardless of whether there is any actual data overwriting taking place. It is to be further appreciated that, for some embodiments, blanking may be considered as occurring at a data stream receiving node, while for other embodiments, blanking may be considered as occurring at an intermediate node between an originating node and a destination node, while in still other embodiments, blanking may be considered as occurring at a data stream originating node, while in yet other embodiments, blanking may be considered as occurring at a combination of one or more of an originating, intermediate, and/or receiving node. It is to be yet further appreciated that, for some embodiments, blanking may be considered as occurring at an in-stream node such as an originating, intermediate, and/or receiving node, while in other embodiments, blanking may be considered as occurring out-of-stream relative to the data stream, such as for embodiments in which an auxiliary node receives signals or information by which identification of the blanked portion can be determined and then transmits information identifying the blanked portion to another out-of-stream node and/or to another in-stream node.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A sensing and communication subsystem, comprising:
a housing;
a passive infrared (PIR) sensor module located within the housing;
one or more antennas located within the housing;
a wireless communication transceiver located within the housing that transmits data via the one or more antennas; and
one or more processors located with the housing that receive information from the PIR sensor module and the wireless communication transceiver, wherein the one or more processors, the PIR sensor module, and the wireless communication transceiver are collectively configured to:
transmit wireless communication signals using the one or more antennas during a first communication time interval;
sense infrared signals using the PIR sensor module during a sensing time interval that overlaps the first communication time interval; and
process the sensed infrared signals received during the sensing time interval to determine a presence of an object, wherein processing comprises blanking the sensed infrared signals received at the start of the first communication time interval, blanking the sensed infrared signals received following the end of the first communication time interval, or blanking the sensed infrared signals received at the start of the first communication time interval and received following the end of the first communication time interval.

2. The sensing and communication subsystem of claim 1, wherein blanking the sensed infrared signals occurs for a predefined time duration.

3. The sensing and communication subsystem of claim 1, wherein blanking the sensed infrared signals comprises ignoring the sensed infrared signals.

4. The sensing and communication subsystem of claim 1, wherein the PIR sensor module is within a distance of 5 cm of the wireless communication transceiver.

5. The sensing and communication subsystem of claim 1, wherein blanking the sensed infrared signals comprises inserting a value of zero into a PIR data stream.

6. The sensing and communication subsystem of claim 1, wherein an antenna of the one or more antennas is a printed circuit board (PCB) mounted loop antenna having a tail.

7. The sensing and communication subsystem of claim 1, wherein the sensing and communication subsystem is incorporated as part of a thermostat.

8. The sensing and communication subsystem of claim 1, further comprising:
an electronic display located within the housing that is in communication with the one or more processors, wherein the electronic display comprises a metallic shield, wherein the metallic shield is electrically connected with an antenna of the one or more antennas such that the metallic shield serves as the antenna's RF ground.

9. A sensing and communication subsystem, comprising:
a housing;
a wireless communication transceiver located within the housing that actively transmits wireless communication signals via an antenna during a transmit-active time interval and that does not transmit wireless communication signals immediately preceding or immediately following the transmit-active time interval;
a passive infrared (PIR) sensor module located within the housing that senses infrared signals received into the housing during the transmit-active time interval and immediately following the transmit-active time interval; and a processing engine that processes the sensed infrared signals to determine a presence of an object, wherein the processing comprises ignoring sensed infrared signals received into the housing by the PIR sensor module at a start of the transmit-active time interval, ignoring the sensed infrared signals received by the PIR sensor module immediately following the transmit-active time interval, or ignoring the sensed infrared signals received into the housing by the PIR sensor module at the start of the transmit-active time interval and immediately following the transmit-active time interval.

10. The sensing and communication subsystem of claim 9, wherein the processing engine ignores the sensed infrared signals for a predefined time duration.

11. The sensing and communication subsystem of claim 9, wherein the PIR sensor module is within a distance of 5 cm of the wireless communication transceiver.

12. The sensing and communication subsystem of claim 9, wherein ignoring the sensed infrared signals comprises inserting a value of zero into a PIR data stream.

13. The sensing and communication subsystem of claim 9, wherein the antenna is a printed circuit board (PCB) mounted loop antenna having a tail.

14. The sensing and communication subsystem of claim 9, further comprising:
an electronic display located within the housing that is in communication with the processing engine, wherein the electronic display comprises a metallic shield, wherein the metallic shield is electrically connected with the antenna such that the metallic shield serves as the antenna's RF ground.

15. The sensing and communication subsystem of claim 9, wherein the sensing and communication subsystem is incorporated as part of a thermostat.

16. A method for sensing and communicating, the method comprising:
generating, by a passive infrared sensor of a sensor device, a PIR data stream indicative of measurements performed by the PIR sensor;
while receiving the PIR data stream, transmitting, by a wireless communication interface of the sensor device, a data transmission;
modifying, by a processing system of the sensor device, the PIR data stream by blanking a portion of the PIR data stream in response to the data transmission, the blanked portion of the PIR data stream corresponding to a start of the data transmission, an end of the data transmission, or the start of the data transmission and the end of the data transmission; and
determining, by the processing system, a presence of an object using the modified PIR data stream.

17. The method for sensing and communicating of claim 16, wherein blanking the sensed infrared signals occurs for a predefined time duration.

18. The method for sensing and communicating of claim 16, wherein blanking the sensed infrared signals comprises ignoring the sensed infrared signals.

19. The method for sensing and communicating of claim 16, wherein the PIR sensor is within a distance of 5 cm of the wireless communication interface.

20. The method for sensing and communicating of claim 16, wherein blanking the sensed infrared signals comprises inserting a value of zero into the PIR data stream.

\* \* \* \* \*